United States Patent
Fang et al.

(10) Patent No.: US 11,487,712 B2
(45) Date of Patent: Nov. 1, 2022

(54) DIGITAL IMAGE SUITABILITY DETERMINATION TO GENERATE AR/VR DIGITAL CONTENT

(71) Applicant: eBay Inc., San Jose, CA (US)

(72) Inventors: Fang Fang, Austin, TX (US); Surabhi Shastri, New York, NY (US); Changchen He, Jersey City, NJ (US); Krutika Shetty, Mountain View, CA (US)

(73) Assignee: eBay Inc., San Jose, CA (US)

( * ) Notice: Subject to any disclaimer, the term of this patent is extended or adjusted under 35 U.S.C. 154(b) by 0 days.

(21) Appl. No.: 17/377,708

(22) Filed: Jul. 16, 2021

(65) Prior Publication Data

US 2021/0342306 A1 Nov. 4, 2021

Related U.S. Application Data

(63) Continuation of application No. 16/596,394, filed on Oct. 8, 2019, now Pat. No. 11,100,054.
(Continued)

(51) Int. Cl.
*G06T 19/00* (2011.01)
*G06F 16/182* (2019.01)
(Continued)

(52) U.S. Cl.
CPC ........ *G06F 16/183* (2019.01); *G06F 16/1834* (2019.01); *G06F 16/2379* (2019.01);
(Continued)

(58) Field of Classification Search
None
See application file for complete search history.

(56) References Cited

U.S. PATENT DOCUMENTS 5,255,352 A 10/1993 Falk
5,495,568 A 2/1996 Beavin
(Continued)

FOREIGN PATENT DOCUMENTS

CN 1787003 A 6/2006
CN 101937078 A 1/2011
(Continued)

OTHER PUBLICATIONS

Final Office Action Received for U.S. Appl. No. 16/591,973, dated Aug. 25, 2021, 20 pages.
(Continued)

*Primary Examiner* — Nicholas R Wilson
(74) *Attorney, Agent, or Firm* — FIG. 1 Patents

(57) ABSTRACT

Techniques image suitability determination to generate augmented reality/virtual reality (AR/VR) digital content are described. A two-dimensional digital image is received. Using machine-learning, a determination as to whether an object captured by the two-dimensional digital image is suitable for generating AR/VR digital content for display in an AR/VR environment is made. If the object is suitable, an indication is provided and an option to view the object in an AR/VR environment is provided. If the object is not suitable, a suggestion indicating why the object as captured is not suitable and/or how to correct the capture of the object in a subsequent digital image such that it is suitable for generating AR/VR digital content.

20 Claims, 13 Drawing Sheets

Related U.S. Application Data

(60) Provisional application No. 62/743,468, filed on Oct. 9, 2018.

(51) Int. Cl.
 *G06F 16/23* (2019.01)
 *H04L 9/32* (2006.01)
 *G06Q 30/06* (2012.01)
 *H04L 9/00* (2022.01)

(52) U.S. Cl.
 CPC ....... *G06Q 30/0603* (2013.01); *G06T 19/006* (2013.01); *H04L 9/3239* (2013.01); *H04L 9/3247* (2013.01); *G06Q 30/0601* (2013.01); *G06T 2200/21* (2013.01); *H04L 9/50* (2022.05)

(56) References Cited

U.S. PATENT DOCUMENTS

| | | | |
|---|---|---|---|
| 5,930,769 | A | 7/1999 | Rose |
| 6,175,655 | B1 | 1/2001 | Lii et al. |
| 6,310,627 | B1 | 10/2001 | Sakaguchi |
| 6,415,199 | B1 | 7/2002 | Liebermann et al. |
| 6,546,309 | B1 | 4/2003 | Gazzuolo |
| 6,643,385 | B1 | 11/2003 | Bravomalo |
| 6,813,838 | B2 | 11/2004 | Mccormick |
| 7,242,999 | B2 | 7/2007 | Wang |
| 7,308,332 | B2 | 12/2007 | Okada et al. |
| 7,328,119 | B1 | 2/2008 | Pryor et al. |
| 7,354,411 | B2 | 4/2008 | Perry et al. |
| 7,398,133 | B2 | 7/2008 | Wannier et al. |
| 7,548,794 | B2 | 6/2009 | Vandergriff et al. |
| 7,714,912 | B2 | 5/2010 | Faisman et al. |
| 8,090,465 | B2 | 1/2012 | Zeng |
| 8,269,778 | B1 | 9/2012 | Baraff et al. |
| 8,359,247 | B2 | 1/2013 | Vock |
| 8,525,828 | B1 | 9/2013 | Bates |
| 8,659,596 | B2 | 2/2014 | Corazza et al. |
| 8,704,832 | B2 | 4/2014 | Taylor et al. |
| 8,711,175 | B2 | 4/2014 | Aarabi |
| 8,736,606 | B2 | 5/2014 | Ramalingam |
| 8,749,556 | B2 | 6/2014 | De Aguiar et al. |
| 8,797,328 | B2 | 8/2014 | Corazza et al. |
| 8,970,585 | B2 | 3/2015 | Weaver |
| 9,098,873 | B2 | 8/2015 | Geisner et al. |
| 9,205,562 | B1 | 12/2015 | Konolige et al. |
| 9,274,595 | B2 | 3/2016 | Reitan |
| 9,292,085 | B2 | 3/2016 | Bennett et al. |
| 9,378,593 | B2 | 6/2016 | Chhugani et al. |
| 9,443,352 | B1 | 9/2016 | Glover et al. |
| 9,460,342 | B1 | 10/2016 | Freund et al. |
| 9,691,161 | B1 | 6/2017 | Yalniz et al. |
| 9,984,409 | B2 | 5/2018 | Naware et al. |
| 10,235,827 | B2 | 3/2019 | Gagner et al. |
| 10,475,113 | B2 | 11/2019 | Naware et al. |
| 11,100,054 | B2 | 8/2021 | Fang et al. |
| 11,270,373 | B2 | 3/2022 | Naware et al. |
| 2001/0026272 | A1 | 10/2001 | Feld et al. |
| 2002/0004763 | A1 | 1/2002 | Lam |
| 2002/0126328 | A1 | 9/2002 | Lehmeier et al. |
| 2002/0174360 | A1 | 11/2002 | Ikeda |
| 2003/0101105 | A1 | 5/2003 | Vock |
| 2003/0139896 | A1 | 7/2003 | Dietz et al. |
| 2004/0049309 | A1 | 3/2004 | Gardner et al. |
| 2004/0083142 | A1 | 4/2004 | Kozzinn |
| 2006/0020482 | A1 | 1/2006 | Coulter |
| 2006/0131401 | A1 | 6/2006 | Do et al. |
| 2006/0202986 | A1 | 9/2006 | Okada et al. |
| 2007/0005174 | A1 | 1/2007 | Thomas |
| 2007/0124215 | A1 | 5/2007 | Simmons, Jr. |
| 2007/0182736 | A1 | 8/2007 | Weaver |
| 2007/0250203 | A1 | 10/2007 | Yamamoto et al. |
| 2008/0071559 | A1 | 3/2008 | Arrasvuor |
| 2008/0140650 | A1 | 6/2008 | Stackpole |
| 2008/0163344 | A1 | 7/2008 | Yang |
| 2008/0201228 | A1 | 8/2008 | Gillet et al. |
| 2008/0201638 | A1 | 8/2008 | Nair |
| 2008/0221403 | A1 | 9/2008 | Fernandez |
| 2008/0312765 | A1 | 12/2008 | Gardiner et al. |
| 2009/0002224 | A1 | 1/2009 | Khatib et al. |
| 2009/0002394 | A1 | 1/2009 | Chen et al. |
| 2009/0018803 | A1 | 1/2009 | Ko et al. |
| 2009/0115777 | A1 | 5/2009 | Reyers Moreno |
| 2009/0144639 | A1 | 6/2009 | Nims et al. |
| 2009/0172587 | A1 | 7/2009 | Carlisle et al. |
| 2009/0276300 | A1 | 11/2009 | Shaw et al. |
| 2010/0030578 | A1 | 2/2010 | Siddique et al. |
| 2010/0049633 | A1 | 2/2010 | Wannier et al. |
| 2010/0082360 | A1 | 4/2010 | Chien et al. |
| 2010/0097395 | A1 | 4/2010 | Chang et al. |
| 2010/0191770 | A1 | 7/2010 | Cho et al. |
| 2010/0280920 | A1 | 11/2010 | Scott et al. |
| 2010/0305909 | A1 | 12/2010 | Wolper et al. |
| 2010/0306082 | A1 | 12/2010 | Wolper et al. |
| 2010/0313141 | A1 | 12/2010 | Yu et al. |
| 2011/0022372 | A1 | 1/2011 | Isogai et al. |
| 2011/0022965 | A1 | 1/2011 | Lawrence et al. |
| 2011/0063208 | A1 | 3/2011 | Van Den et al. |
| 2011/0184831 | A1 | 7/2011 | Dalgleish |
| 2011/0191070 | A1 | 8/2011 | Ramalingam |
| 2011/0231278 | A1 | 9/2011 | Fries |
| 2011/0234591 | A1 | 9/2011 | Mishra et al. |
| 2011/0292034 | A1 | 12/2011 | Corazza et al. |
| 2011/0298897 | A1 | 12/2011 | Sareen et al. |
| 2012/0030062 | A1 | 2/2012 | Stauffer et al. |
| 2012/0054059 | A1 | 3/2012 | Rele |
| 2012/0078145 | A1 | 3/2012 | Malhi et al. |
| 2012/0095589 | A1 | 4/2012 | Vapnik |
| 2012/0233003 | A1 | 9/2012 | Calman et al. |
| 2012/0281019 | A1 | 11/2012 | Tamstorf et al. |
| 2012/0299912 | A1 | 11/2012 | Kapur et al. |
| 2012/0308087 | A1 | 12/2012 | Chao et al. |
| 2012/0309520 | A1 | 12/2012 | Evertt et al. |
| 2012/0310791 | A1 | 12/2012 | Weerasinghe |
| 2013/0024301 | A1 | 1/2013 | Mikan et al. |
| 2013/0071584 | A1 | 3/2013 | Bell |
| 2013/0108121 | A1 | 5/2013 | De Jong |
| 2013/0110482 | A1 | 5/2013 | Ellens et al. |
| 2013/0173226 | A1 | 7/2013 | Reed et al. |
| 2013/0215116 | A1 | 8/2013 | Siddique et al. |
| 2013/0258045 | A1 | 10/2013 | Wojciech |
| 2013/0258117 | A1 | 10/2013 | Penov et al. |
| 2013/0268399 | A1 | 10/2013 | Lu et al. |
| 2013/0317944 | A1 | 11/2013 | Huang et al. |
| 2013/0317950 | A1 | 11/2013 | Abraham et al. |
| 2014/0035913 | A1 | 2/2014 | Higgins et al. |
| 2014/0114620 | A1 | 4/2014 | Grinspun et al. |
| 2014/0114884 | A1 | 4/2014 | Daway |
| 2014/0129390 | A1 | 5/2014 | Mauge et al. |
| 2014/0164902 | A1 | 6/2014 | Sager |
| 2014/0176565 | A1 | 6/2014 | Adeyoola et al. |
| 2014/0180864 | A1 | 6/2014 | Orlov et al. |
| 2014/0257993 | A1 | 9/2014 | Paolini |
| 2014/0267717 | A1 | 9/2014 | Pitzer et al. |
| 2014/0270540 | A1 | 9/2014 | Spector et al. |
| 2014/0279200 | A1 | 9/2014 | Hosein et al. |
| 2014/0279289 | A1 | 9/2014 | Steermann |
| 2014/0313192 | A1 | 10/2014 | Corazza et al. |
| 2014/0333614 | A1 | 11/2014 | Black et al. |
| 2014/0368499 | A1 | 12/2014 | Kaur |
| 2015/0046375 | A1 | 2/2015 | Mandel et al. |
| 2015/0070351 | A1 | 3/2015 | Tarquini et al. |
| 2015/0130795 | A1 | 5/2015 | Chhugani et al. |
| 2015/0134302 | A1 | 5/2015 | Chhugani et al. |
| 2015/0134493 | A1 | 5/2015 | Su et al. |
| 2015/0134494 | A1 | 5/2015 | Su et al. |
| 2015/0134495 | A1 | 5/2015 | Naware et al. |
| 2015/0134496 | A1 | 5/2015 | Grinblat et al. |
| 2015/0154691 | A1 | 6/2015 | Curry et al. |
| 2015/0186977 | A1 | 7/2015 | Leonard et al. |
| 2015/0366504 | A1 | 12/2015 | Connor |
| 2016/0035061 | A1 | 2/2016 | Gadre et al. |
| 2016/0063588 | A1 | 3/2016 | Gadre et al. |

(56) References Cited

U.S. PATENT DOCUMENTS

| | | | |
|---|---|---|---|
| 2016/0088284 | A1 | 3/2016 | Sareen et al. |
| 2016/0092956 | A1 | 3/2016 | Su et al. |
| 2016/0093085 | A1 | 3/2016 | Ray et al. |
| 2016/0117749 | A1 | 4/2016 | Desmarais et al. |
| 2016/0155186 | A1 | 6/2016 | Su et al. |
| 2016/0165988 | A1 | 6/2016 | Glasgow et al. |
| 2016/0165989 | A1 | 6/2016 | Glasgow et al. |
| 2016/0171583 | A1 | 6/2016 | Glasgow et al. |
| 2016/0180447 | A1 | 6/2016 | Kamalie et al. |
| 2016/0180449 | A1 | 6/2016 | Naware et al. |
| 2016/0180562 | A1 | 6/2016 | Naware et al. |
| 2016/0210602 | A1 | 7/2016 | Siddique et al. |
| 2016/0247017 | A1 | 8/2016 | Sareen et al. |
| 2016/0249699 | A1 | 9/2016 | Inghirami |
| 2016/0292779 | A1 | 10/2016 | Rose et al. |
| 2016/0292915 | A1 | 10/2016 | Chhugani et al. |
| 2017/0004567 | A1 | 1/2017 | Dutt et al. |
| 2017/0163882 | A1 | 6/2017 | Piramuthu et al. |
| 2017/0243064 | A1 | 8/2017 | Simari et al. |
| 2019/0138834 | A1 | 5/2019 | Collet Romea et al. |
| 2020/0034918 | A1 | 1/2020 | Naware et al. |
| 2020/0111261 | A1 | 4/2020 | Fang et al. |
| 2021/0064217 | A1 | 3/2021 | Mildrew et al. |
| 2021/0335034 | A1 | 10/2021 | Bell et al. |

FOREIGN PATENT DOCUMENTS

| | | | |
|---|---|---|---|
| CN | 102099829 | A | 6/2011 |
| CN | 102201032 | A | 9/2011 |
| CN | 102842089 | A | 12/2012 |
| CN | 102890742 | A | 1/2013 |
| CN | 103049854 | A | 4/2013 |
| CN | 103455501 | A | 12/2013 |
| CN | 103597519 | A | 2/2014 |
| CN | 103605832 | A | 2/2014 |
| CN | 107564063 | A | 1/2018 |
| DE | 19922150 | A1 | 11/2000 |
| EP | 2091015 | A1 | 8/2009 |
| EP | 2187325 | A1 | 5/2010 |
| EP | 3155560 | A1 | 4/2017 |
| JP | 2001-319108 | A | 11/2001 |
| JP | 2017124192 | | 7/2017 |
| WO | 2010/060113 | A1 | 5/2010 |
| WO | 2012/110828 | A1 | 8/2012 |
| WO | 2013/188908 | A1 | 12/2013 |
| WO | 2014/182545 | A1 | 11/2014 |
| WO | 2015/185110 | A1 | 12/2015 |
| WO | 2016/106193 | A1 | 6/2016 |
| WO | 2016/106216 | A2 | 6/2016 |
| WO | 2016/106216 | A3 | 8/2016 |
| WO | 2016/160776 | A1 | 10/2016 |
| WO | 2017/095834 | A1 | 6/2017 |
| WO | 2017/142772 | A1 | 8/2017 |
| WO | 2020/076871 | A1 | 4/2020 |

OTHER PUBLICATIONS

Corrected Notice of Allowability Received for U.S. Appl. No. 16/596,394, dated Jul. 28, 2021, 2 Pages.
Final Office Action Received for U.S. Appl. No. 16/596,394, dated Apr. 1, 2021, 33 Pages.
Non Final Office Action Received for U.S. Appl. No. 16/596,394, dated Oct. 15, 2020, 28 Pages.
Notice of Allowance Received for U.S. Appl. No. 16/596,394, dated Jun. 2, 2021, 13 Pages.
The Sims 4—Tutorial: Building A Starter House, https://www.youtube.com/watch?v=OTKipK6UvSs, pertinent timestamps 7:15-7:30 minutes; herein referred to as "The Sims 4". Sep. 8, 2014 3 Pages.
Rother et al., "GrabCut—Interactive Foreground Extraction using Iterated Graph Cuts", Retrieved from the Internet: <URL https://cvg.ethz.ch/teaching/cvl/2012/grabcut-siggraph04.pdf>, 2004, 6 pages.

Notice of Allowance Received for U.S. Appl. No. 16/591,973, dated Dec. 14, 2021, 9 Pages.
10-2021-7008279 , "Office Action received for Korean Patent Application No. 10-2021-7008279 dated Mar. 14, 2022", Mar. 14, 2022, 5 Pages.
AR Object Toolkit—Augmented Reality For Shopping, Merchandising, Product Demos and More, Retrieved from the Internet URL: https://www.groovejones.com/ar_object_toolkit/, Mar. 23, 2018, 15 pages.
Advisory Action received for U.S. Appl. No. 14/581,351, dated Nov. 26, 2018, 9 pages.
Final Office Action received for U.S. Appl. No. 14/581,351, dated Aug. 10, 2018, 14 pages.
Non-Final Office Action received for U.S. Appl. No. 14/581,351, dated Nov. 30, 2017, 16 pages.
Notice of Allowance received for U.S. Appl. No. 14/581,351, dated May 3, 2019, 18 pages.
Notice Of Allowance received for U.S. Appl. No. 14/581,351, dated Sep. 12, 2019, 8 pages.
Extended European Search report received for European Patent Application No. 15874235.3, dated Aug. 18, 2017, 7 pages.
Photoshop, "Placing An Image Inside of Another With Photoshop CS6", Sep. 9, 2014, 8 pages.
Non Final Office Action Received for U.S. Appl. No. 16/591,973, dated Jun. 21, 2021, 16 pages.
Rudolph, et al., "A Simple Load Balancing Scheme for Task Allocation in Parallel Machines", Jun. 1991, 237-245 pp.
Satish, et al.,"Can Traditional Programming Bridge the Ninja Performance Gap for Parallel Computing Applications", Jun. 9-13, 2012, 12 pages.
Selle, et al., "Robust High-Resolution Cloth Using Parallelism, History-Based Collisions and Accurate Friction", Mar.-Apr. 2009, pp. 1-12.
Styku,"Styku Startup Revolutionizes Apparel Shopping, Reduces Returns with Virtual Fitting Room", Nov. 6, 2012, 4 pages.
Office Action Received for Chinese Patent Application No. 201580076565.0, dated Mar. 18, 2020, 32 pages (14 Pages and 18 pages of English Translation).
Office Action Received for Chinese Patent Application No. 201580076565.0, dated Dec. 3, 2020, 3 pages.
Basenese,"Virtual Fitting Rooms . . . Coming to a Store Near You", Retrieved from the internet URL:<https://www.wallstreetdaily.com/2011/07/07/virtual-fitting-rooms-fits-me/>, Wall Street Daily, [Online] (Aug. 13, 2014 ), Jul. 7, 2011, 1 page.
Binkley,"The Goal: A Perfect First-Time Fit: True Fit Is Online Retailers Latest Attempt to Help Consumers Buy Rigilt Size; No Tape Measures", Retrieved from the Internet:<URL:http://online.wsj.cominewslarticiesSB10001424052702304724404577293593210807790#printMode>, Achieving a Perfect Fit in Online Shopping WSJ, 2012, Mar. 23, 2012, 4 pages.
Bossard et al., "Apparel classification with style", Retrieved from the internet URL:<http://www.vision.ee.ethz.ch/~lbossard/bossard_accv12_apparel-classification-with-style.pdf>, Computervision ACCV 2012, Springer Berlin Heidelberg, Berlin, Heidelberg, 2012, pp. 321-335.
Brooks et al., "Towards an Inclusive Virtual Dressing Room for Wheelchair-Bound Customers", International Conference on Collaboration Technologies and Systems (CTS), May 19-23, 2014, pp. 582-589.
Bryant,"Fits.me Launches Robot to Help Women Size Up Clothes Online", Retrieved from the URL internet :<https://thenextweb.com/eu/2011/06/10/fits-me-launches-robot-to-help-women-size-up-clothes-online/#.tnw_BRXPLr8L>, Jun. 10, 2011, 4 pages.
Chang,"Virtual Fitting Rooms Changing the Clothes Shopping Experience", Retrieved from the internet URL:<http://articles.latimes.com/2012/jul/13/business/la-fi-virtual-dressing-room-20120714>, Los Angeles Times, [Online], Jul. 13, 2012, 3 pages.
Cheng et al., "A 3D Virtual Show Room for Online Apparel Retail Shop", In Proceedings: APSIPA ASC 2009: Asia-Pacific Signal and Information Processing Association, Annual Summit and Conference. Retrieved from the internet URL: < http://www.apsipa.org>,

(56) References Cited

OTHER PUBLICATIONS

In Proceedings: APSIPA ASC 2009: Asia-Pacific Signal and Information Processing Association, Annual Summit and Conference, Oct. 4-7, 2009, 193-199.

Criminisi et al., "Single View Metrology", International Journal of Computer Vision, vol. 40, Issue 2, 2000, 123-148 pp.

Fuhrmann et al., "Interaction-free dressing of virtual humans", Computers & Graphics 27, No. 1, 2003, pp. 71-82.

Gardner et al., "Learning to Predict Indoor illumination from a Single Image", 2017, 13 Pages.

Gioberto, "Garment-Integrated Wearable Sensing for Knee Joint Monitoring", Proceedings of the 2014 ACM International Symposium on Wearable Computers: Adjunct Program, Sep. 13-17, 2014, 113-118 pages.

Gioberto et al., "Overlock-Stitched Stretch Sensors: Characterization and Effect of Fabric Property", Journal of Textile and Apparel, Technology and Management, vol. 8, Issue 3, 2013, 14 pages.

Hughes et al., "Physical simulation for animation and visual effects: parallelization and characterization for chip multiprocessors", In ACM SIGARCH Computer Architecture News, vol. 35, No. 2, May 2007, 12 pages.

Jojic et al., "A framework for garment shopping over the Internet", Handbook on Electronic Commerce, Chapter 12, Handbook on Electronic Commerce, 2000, 22 pages.

Sven Maerivoet, "An introduction to image enhancement in the spatial domain", Nov. 17, 2000, 25 pages.

Karsch et al., "Rendering synthetic objects into legacy photographs", ACM Transactions on Graphics (TOG). vol. 30. No. 6, 2011, 12 pages.

Kristensen et al., "Towards a Next Generation Universally Accesible 'Online Shopping-for-Apparel' System", Retrieved from the internet URL:<http://vbn.aau.dk/files/78490156VDR_paper_from_HCII2013_V03_LNCS8006_978_3_642_39264_1.pdf>, Human-Computer Interaction, Part III, HCII LNCS 8006, 2013, pp. 418-427.

Li et al., "Wearable Sensors in Intelligent Clothing for Measuring Human Body Temperature Based on Optical Fiber Bragg Grating", Retrieved from the Internet: <URL: htp://ro.uow.edu.au/eispapers/298>, Optics Express, vol. 20, Issue 11, May 9, 2012, 11740-11752 pp.

Lim et al., "Characterization of noise in digital photographs for image processing", https://www.spiedigitallibrary.org/conference-proceedings-of-spie/6069/606900/Characterization-of-noise-in-digital-photographs-for-image-processing/10.1117/12.655915.short, Feb. 10, 2006, 10 pages.

Luo et al., "Reactive 2D/3D garment pattern design modification", Computer-Aided Design, vol. 37, No. 6, May 2005, pp. 623-630.

Niceinteractive, "Virtual Dressing Room", Retrieved from the Internet: <URL: https://www.youtube.com/watch?v=UhOzN2z3wtI>, (Sep. 3, 2012),, 2 minutes, 14Seconds, Aug. 3, 2017, 2 pages.

O'Brien, "Fits.me—Imitates Ladies of All Shapes and Sixes, Tries Clothes on for you (video)", Retrived from the internet URL:<https://www.engadget.com/2011/06/13/fits-me-imitates-ladies-of-all-shapes-and-sizes-tries-clothes-o/>, Accessed Aug. 13, 2014), Jun. 13, 2011, 10 pages.

Okreylos, "3D Video Capture with Three Kinects", Retrieved from the Internet: <URL: https://www.youtube.com/watch?v=Ghgbycqb92c>, Accessed on (May 13, 2014), 5 minutes, 35 seconds, May 13, 2014, 3 pages.

International Preliminary Report on Patentability received for PCT Patent Application No. PCT/US2015/067044, dated Jul. 6, 2017, 9 pages.

International Search Report received for PCT Patent Application No. PCT/US2015/067044, dated Mar. 11, 2016, 2 pages.

Written Opinion received for PCT Application No. PCT/US2015/067044, dated Mar. 11, 2016, 7 pages.

International Preliminary Report on Patentability Received for PCT Patent Application No. PCT/US2019/055263, dated Apr. 22, 2021, 9 Pages.

International Search Report Received for PCT Patent Application No. PCT/US2019/055263, dated Jan. 21, 2020, 6 pages.

International Written Opinion received for PCT Patent Application No. PCT/US2019/055263, dated Jan. 21, 2020, 7 pages.

Xiang, et al., "Subcategory-aware Convolutional Neural Networks for Object Proposals and Detection", 2017, 10 pages.

Yang, et al., "Detailed garment recovery from a single-view image", 2016, 1-13 pp.

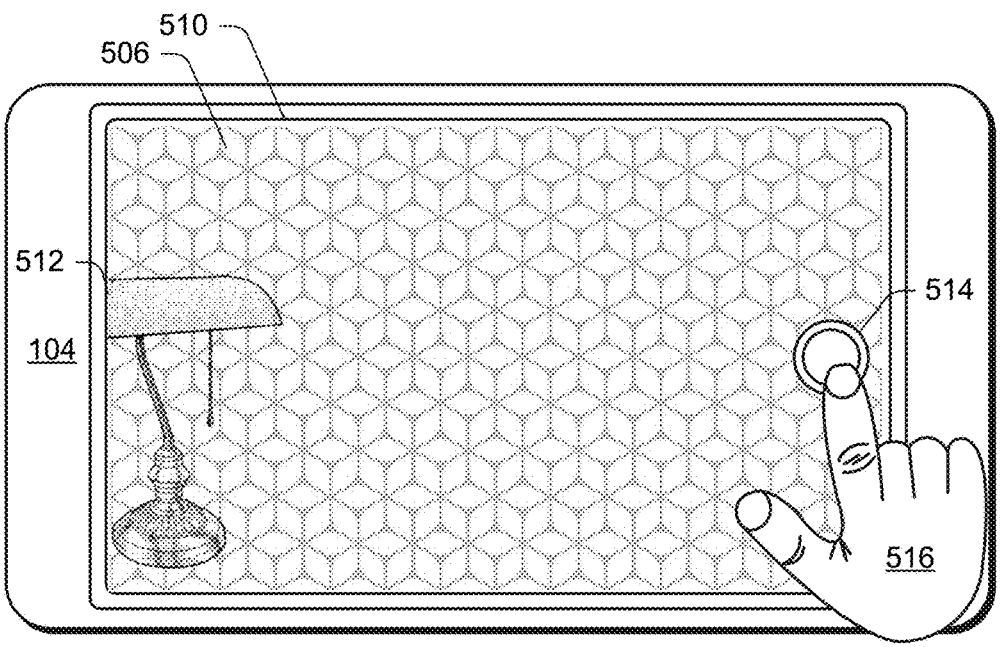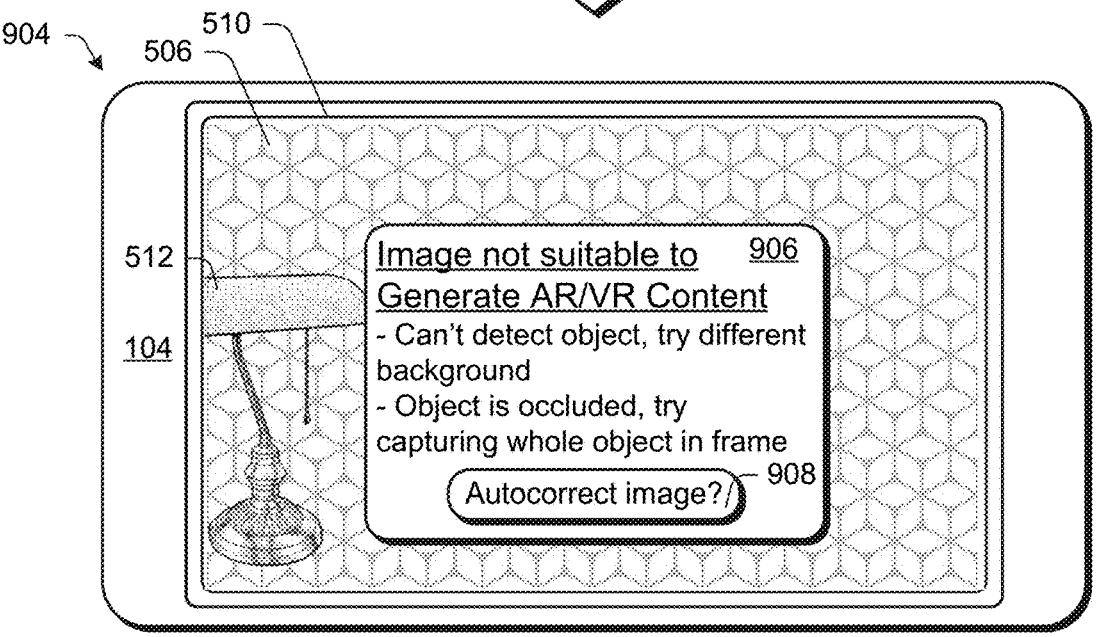
Fig. 9

DIGITAL IMAGE SUITABILITY DETERMINATION TO GENERATE AR/VR DIGITAL CONTENT

RELATED APPLICATIONS

This Application claims priority as a continuation to U.S. patent application Ser. No. 16/596,394, filed Oct. 8, 2019, and titled "Digital Image Suitability Determination to Generate AR/VR Digital Content," the entire disclosure of which is hereby incorporated by reference in its entirety.

BACKGROUND

Augmented and virtual reality (AR/VR) environments have been developed to increase an amount of functionality available to a user of a computing device. In an augmented reality environment, AR/VR digital content is used to "augment" a user's direct view of a physical environment, in which, the computing device is disposed. A mobile device that is equipped with a digital camera (e.g., a mobile phone or tablet), for instance, may be used to view a real-world scene and augment the real-world scene using the AR/VR digital content as virtual objects or components. In a VR environment, a physical environment may be recreated (i.e., "virtualized") and viewed by a user in which the AR/VR digital content is used to generate objects that are viewed within this environment. In both instances, the AR/VR environment may support an immersive user experience with a computing device using the AR/VR digital content.

Conventional techniques used to generate AR/VR digital content, however, are confronted with a variety of challenges. These challenges include how to generate the AR/VR digital content in a form that is suitable for rendering as part of the AR/VR environment (e.g., to appear "like it is really there"), how to model the AR/VR digital content, as well as how to size and place the AR/VR digital content within the environment. These challenges are further exacerbated by whether a source used to generate the AR/VR digital content is suitable to do so. Accordingly, conventional techniques used to generate AR/VR digital content are typically limited to use by sophisticated users using complex tools or force unsophisticated users to repeatedly attempt to create suitable AR/VR digital content. As such, AR/VR digital content as generated using conventional techniques and systems is limited from use in a wide range of scenarios, examples of which include social media systems, product and service listings, digital services, and so forth.

SUMMARY

To overcome these problems, digital image suitability determination is leveraged to generate AR/VR digital content for display in an AR/VR environment. Initially, a two-dimensional digital image of an object is received and using computer vision and machine-learning technologies, a determination as to whether the image of the object is suitable or not suitable for generating AR/VR digital content for display in an AR/VR environment is made. If the digital image of the object is determined to be suitable, AR/VR digital content of the object is generated and provided to a user for display in an AR/VR environment. If the two-dimensional digital image of the object is determined to be not suitable, an indication that the image of the object is not suitable to generate AR/VR digital content, and/or suggestions on how to improve a subsequent digital image of the object such that it is suitable to generate AR/VR digital content for display in an AR/VR environment is provided. In addition, an option to autocorrect a subsequent digital image of the object may be provided, or a subsequent image may be captured incorporating the corrections automatically and without user intervention to ensure suitability for generating AR/VR digital content for display in an AR/VR environment.

Additionally, techniques for providing a non-modal end to end AR/VR experience in an online marketplace are provided. In the non-modal AR/VR environment a user may search for items, select items, add multiple items, delete items, scale items, move items, and otherwise modify and manipulate items, as well as receive recommendations, purchase items, etc. all within an AR/VR environment.

This Summary introduces a selection of concepts in a simplified form that are further described below in the Detailed Description. As such, this Summary is not intended to identify essential features of the claimed subject matter, nor is it intended to be used as an aid in determining the scope of the claimed subject matter.

BRIEF DESCRIPTION OF THE DRAWINGS

The detailed description is described with reference to the accompanying figures. Entities represented in the figures may be indicative of one or more entities and thus reference may be made interchangeably to single or plural forms of the entities in the discussion.

FIG. 9 depicts an example of output of a user interface used to initiate capture of a digital image and output of a suggestion.

DETAILED DESCRIPTION

Overview

Figure 1:
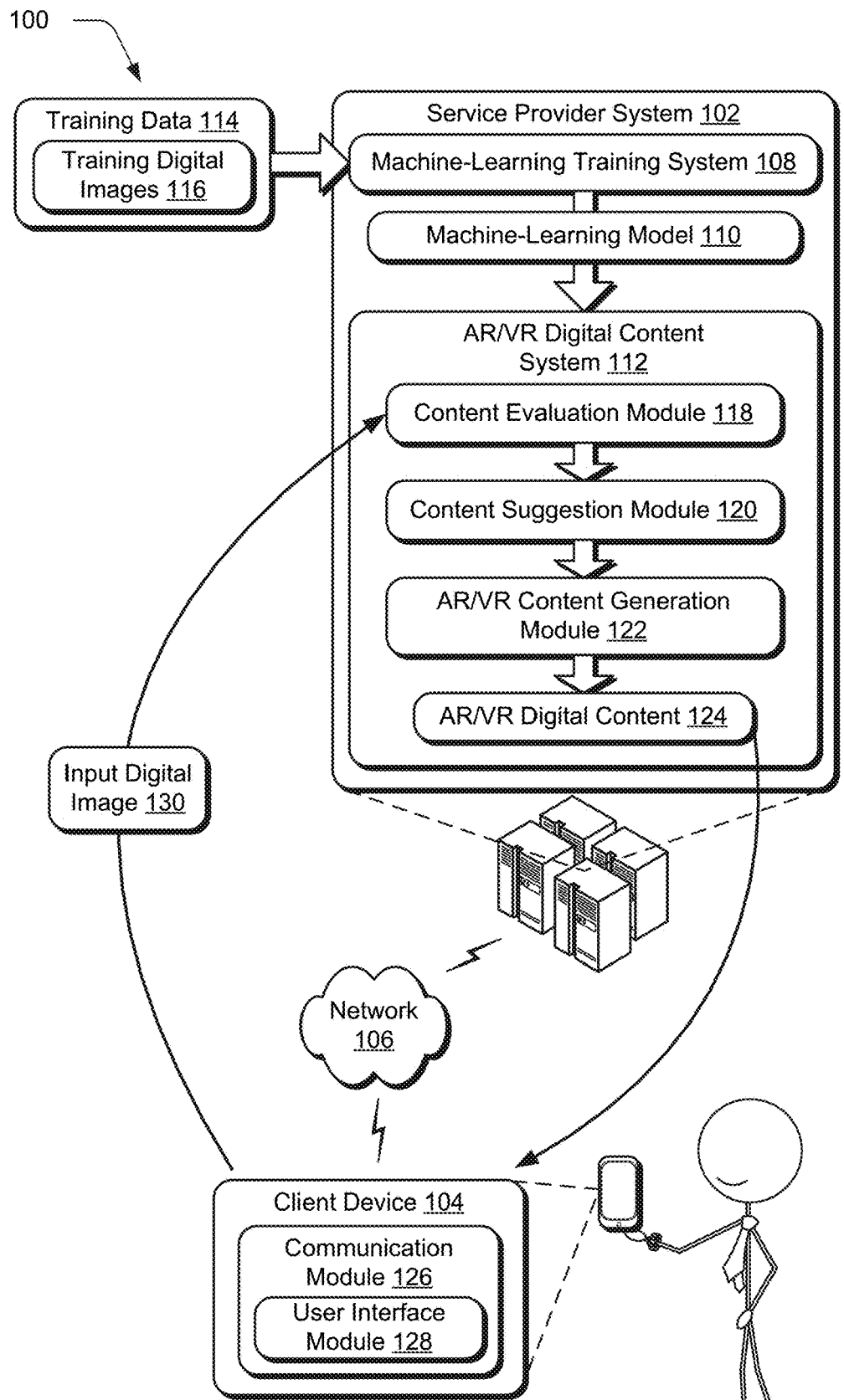
FIG. 1 is an illustration of an environment in an example implementation that is operable to employ digital image suitable determination techniques to generate AR/VR digital content described herein.

Techniques and systems are described that address the challenges and inefficiencies of conventional techniques in generating AR/VR digital content. In one example, these techniques and systems are configured to determine suitability of a digital image (e.g., a two-dimensional digital image) to generate AR/VR digital content for rendering as part of an AR/VR environment. In this way, both computational and user efficiency in generation of AR/VR digital content may be improved by determining whether the digital image is suitable before actual generation of the AR/VR digital content. Examples are also described in which the techniques and systems described herein are configured to output suggestions to indicate why an object as captured by the digital image is not suitable to generate the AR/VR digital content and/or how to correct capture of the object in a subsequent digital image. Other examples are described in which a subsequent image is captured with corrections implemented automatically and without user intervention, an option to autocorrect an image is provided that is user selectable to correct the digital image, and so on.

A user, for instance, may interact with a mobile device to capture a digital image of an object using a digital camera incorporated as part of the mobile device. A machine-learning model may then be employed by an AR/VR digital content system to determine whether the object as captured by the digital image is suitable to generate AR/VR digital content without actually attempting to generate the AR/VR digital content. This determination of suitability may also address an AR/VR environment, in which, the AR/VR content is to be disposed (including respective portions of the AR/VR environment) as well as suitability of the AR/VR digital content for display with other AR/VR digital content displayed in the AR/VR environment. In this way, operational efficiency of computational resources of the mobile phone may be improved over conventional techniques that may involve repeated attempts at capturing digital images in order to obtain one that is suitable for generating the AR/VR digital content and are not used until a determination is made that the digital image is suitable.

Additionally, the AR/VR digital content system may be configured to output suggestions indicating why the AR/VR digital content is not suitable for generating AR/VR digital content and/or how to correct capture of the object. The suggestions, for instance, may be generated by one or more machine-learning models that identify "why" the digital image is not suitable, e.g., rotated, bad background, lighting, occlusion, angle, zoom, resolution, and so on. In one example, an option to autocorrect capture of the object is provided based on the suggestions. In another example, a subsequent capture of the object in a digital image may be initiated in which implementation of suggested corrections occurs automatically and without user intervention, e.g., image filters, camera setting, and so on. Again, this functions to improve user and operational efficiency of computing devices that implement these techniques to generate AR/VR digital content. Further discussion of these and other techniques is included in the following sections.

In the following discussion, an example environment is described that may employ the techniques described herein. Example procedures are also described which may be performed in the example environment as well as other environments. Consequently, performance of the example procedures is not limited to the example environment and the example environment is not limited to performance of the example procedures.

Example Environment

FIG. 1 is an illustration of a digital medium environment 100 in an example implementation that is operable to employ digital image suitability determination techniques to generate AR/VR digital content described herein. The illustrated environment 100 includes a service provider system 102 and a client device 104 of a user that are communicatively coupled, one to another, via a network 106. Computing devices that implement the service provider system 102 and the client device 104 may be configured in a variety of ways.

A computing device, for instance, may be configured as a desktop computer, a laptop computer, a mobile device (e.g., assuming a handheld configuration such as a tablet or mobile phone as illustrated for the client device 104), and so forth. Thus, a computing device may range from full resource devices with substantial memory and processor resources (e.g., personal computers, game consoles) to a low-resource device with limited memory and/or processing resources (e.g., mobile devices). Additionally, a computing device may be representative of a plurality of different devices, such as multiple servers utilized by a business to perform operations "over the cloud" as illustrated for the service provider system 102 and as described in relation to FIG. 13.

The service provider system 102 as illustrated in this example includes a machine-learning training system 108 that is configured to generate (e.g., train) a machine-learning model 110 for use by an AR/VR digital content system 112. The machine-learning model 110, for instance, may be configured as a neural network (e.g., a convolutional neural network) that is trained as a classifier using training data 114 having training digital images 116. The training digital images 116, for instance, may include both good and bad examples of a desired output that is used to infer patterns usable to classify subsequent digital images (e.g., as a probability) as having or not having the desired output. The machine-learning model 110 is trained to output a score (i.e., a probability) that a digital image does or does not (e.g., on a scale of 0-1) have a trained characteristic. The machine-learning model 110, once trained, may then be leveraged by the AR/VR digital content system 112 in a variety of ways.

The AR/VR digital content system 112, for instance, includes a content evaluation module 118 that may employ the machine-learning module 110 to determine suitability of a digital image to generate AR/VR digital content 124. To do so, the training data 114 includes training digital images 116 having good and bad examples of digital images as capturing objects that are suitable for generating AR/VR digital content.

Figure 2:
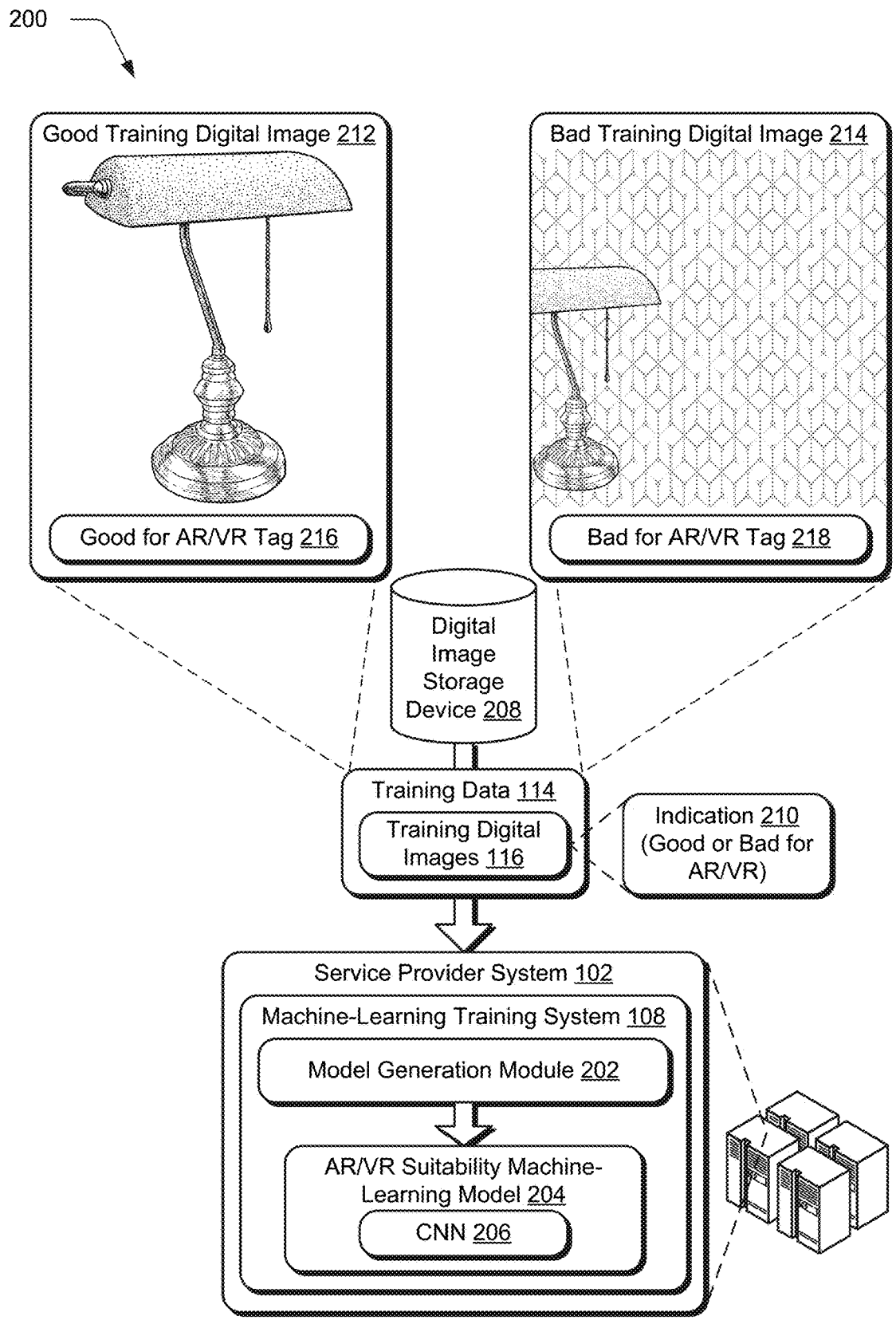
FIG. 2 depicts an example of operation of a machine-learning training system of FIG. 1 to generate a machine-learning model to indicate suitability of a digital image to generate AR/VR digital content.

As shown and further described in relation to FIG. 2, the training data 114 may include good examples of digital images as capturing an object that is readily identifiable in the digital image. Bad examples, on the other hand, include digital images that capture the object in a manner in which it is difficult to distinguish the object, e.g., due to background, lighting, and so forth. Therefore, the machine-learning model 110, once trained, may then be used by the content evaluation module 118 to determine suitability of a subsequent digital image for generating AR/VR digital content as further described in relation to FIG. 4. In this way, the suitability of the digital image may be determined without actually attempting to generate the AR/VR digital content, thereby improving operational efficiency of the computing device by not needlessly consuming resources on digital images that are not suitable as well as reducing user frustration caused by generation of non-suitable AR/VR digital content.

In another instance, the AR/VR digital content system 112 includes a content suggestion module 120 that is configured to leverage the machine-learning model 110 to generate a suggestion. The suggestion may be configured in a variety of ways, such as to indicate why the object as captured by the digital image is not suitable to generate AR/VR digital content and/or how to correct capture of the object in a subsequent digital image. Therefore, the training data 114 in this instance is configured to indicate examples of why the object is not suitable or examples of known ways in how to correct capture of the object as shown and described in relation to FIG. 3. Therefore, the machine-learning model 110, once trained, is configured to output a score (e.g., a probability) that the digital image is not suitable based on a corresponding reason or how to correct capture of the object in a subsequent digital image as shown and described in relation to FIGS. 8-10.

In this way, the AR/VR digital content system 112 may determine suitability of a digital image for generating AR/VR digital content through use of the content evaluation module 118 and generate suggestions through use of the content suggestion module 120 indicating why the digital image is not suitable and/or how to correct capture in a subsequent digital image. A user of the client device 104, for instance, may interact with a communication module 126 (e.g., browser, network-enabled application) to communicate with the service provider system 102 via the network 106. The communication module 126 includes a user interface module 128 configured to output a user interface including a user-selectable option to initiate capture of an input digital image 130, e.g., as part of a real time stream of digital images.

The input digital image 130 is then communicated by the communication module 126 over the network 106 to the AR/VR digital content system 112. The content evaluation module 118 is first employed in this example to determine suitability of the input digital image 130 (e.g., as a two-dimensional digital image) to generate AR/VR digital content. If the content evaluation module 118 indicates the input digital image 130 is not suitable, a content suggestion module 120 is then employed responsive to this determination to generate suggestions as to why an object as captured by input digital image 130 is not suitable and/or how to correct capture of the object in a subsequent digital image. The suggestions may then be communicated via the network 106 for output in a user interface generated by the user interface module 128, e.g., along with the digital image.

Figure 6:
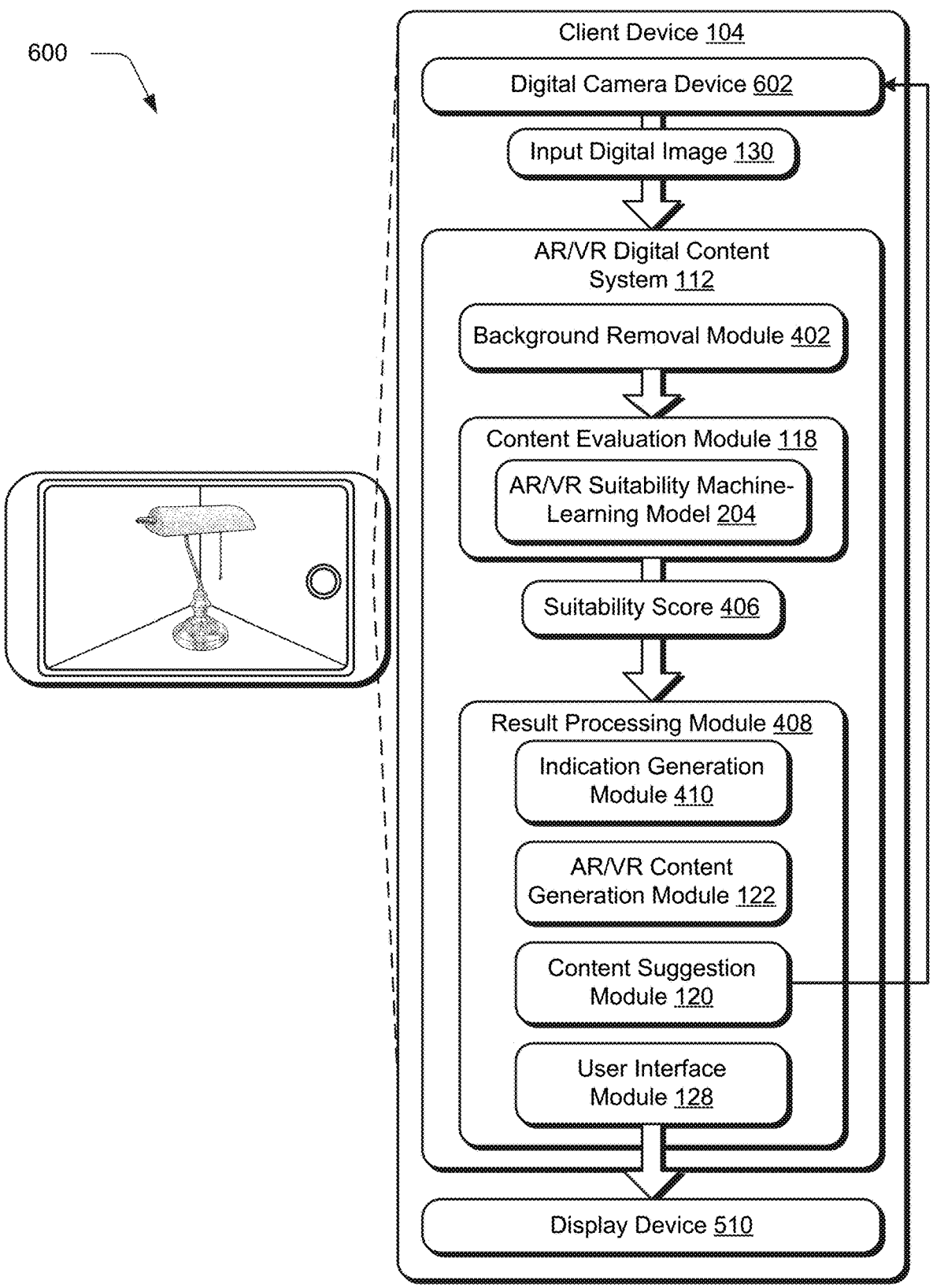
FIG. 6 depicts an example of implementation of the AR/VR digital content system of FIG. 4 locally at the client device.

If the content evaluation module 118 indicates that input digital image 130 is suitable, an indication of this suitability may also be output for viewing in the user interface by the user interface module 128. In an example, the indication is user selectable to cause an AR/VR content generation module 122 to generate AR/VR digital content 124 using the input digital image 130. This may include mapping the input digital image 130 to a model that is sized for rendering as part of an AR/VR environment. This may include also configuring the AR/VR digital content 124 for rendering in two dimensions and as such conserve computational resources of the client device 104 and supports real time operation. Other examples in which the AR/VR digital content 124 is generated as a three-dimensional model are also contemplated, e.g., by matching the object to a corresponding pre-computed 3D model, generation of the 3D model "from scratch," and so forth. Although this example describes implementation of the AR/VR digital content system 112 remotely by the service provider system 102, this functionality may also be incorporated in whole or in part by the client device 104 as shown in FIG. 6.

Figure 7:
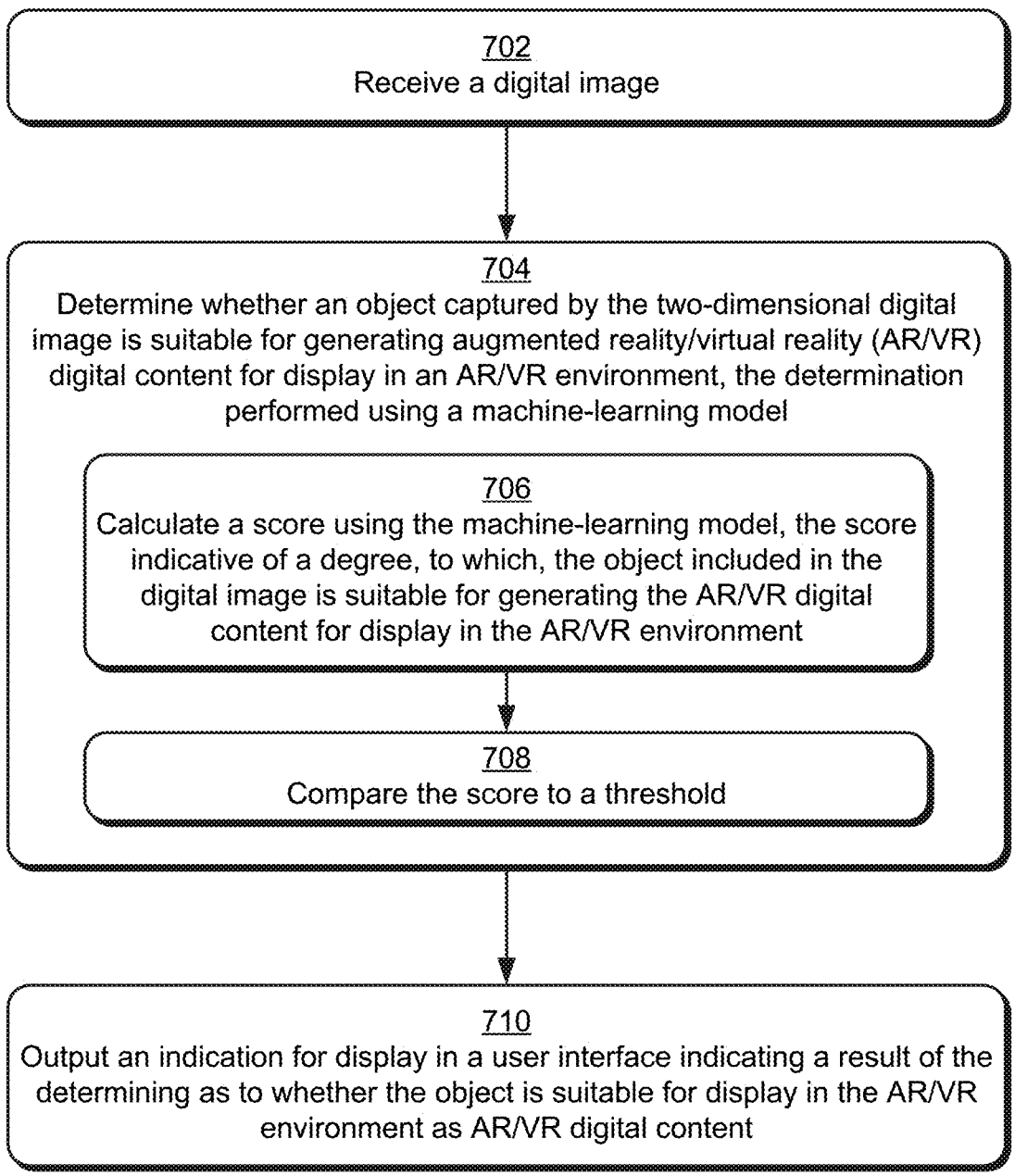
FIG. 7 is a flow diagram depicting a procedure in an example implementation of determining suitability of a digital image for generating AR/VR digital content without actually generating the AR/VR digital content.
Figure 8:
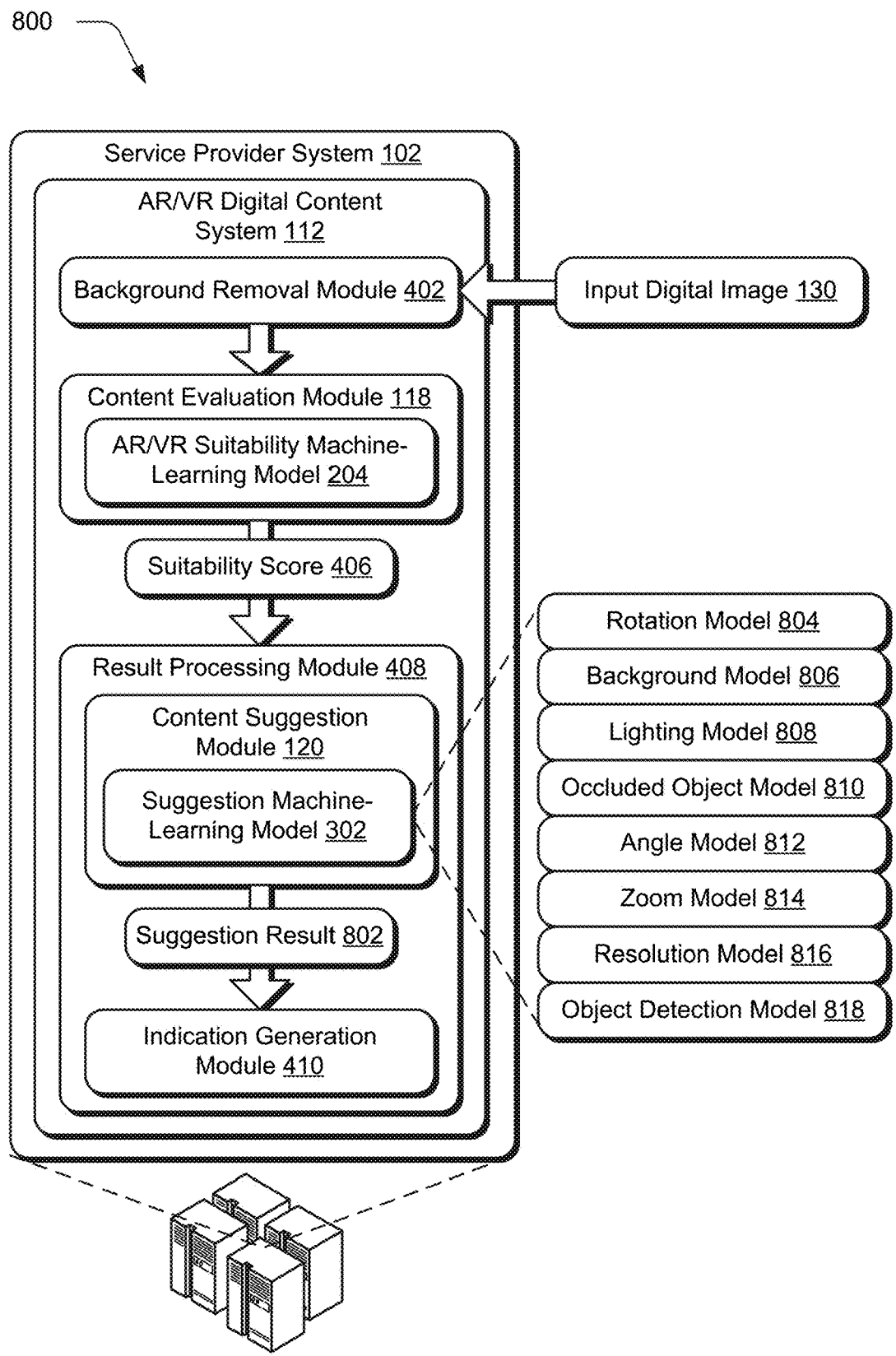
FIG. 8 depicts an example 800 of operation of the AR/VR digital content system of FIG. 1 as employing a suggestion machine-learning model as trained in the example of FIG. 3 to generate suggestions regarding suitability of an input digital image to generate AR/VR digital content.
Figure 10:
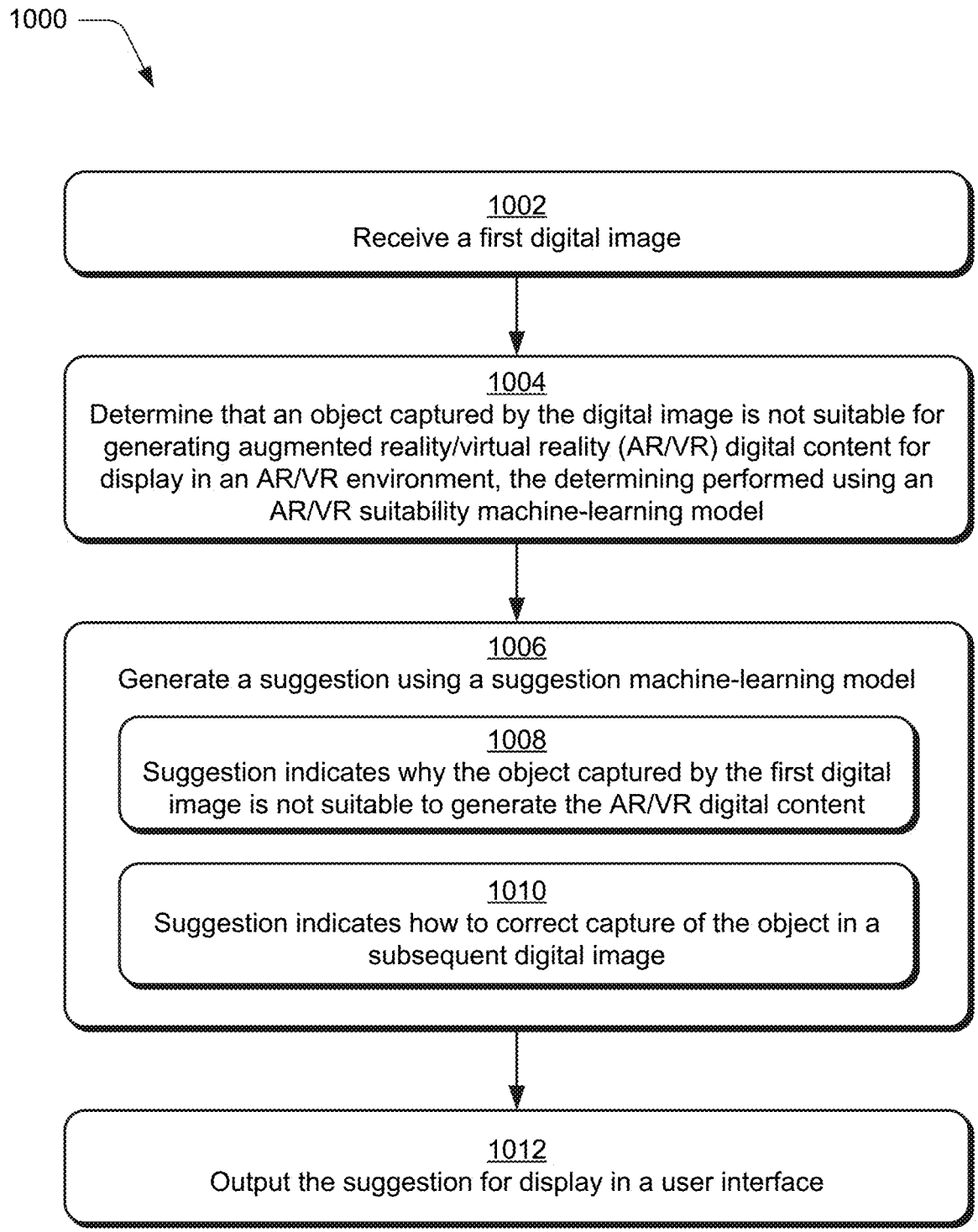
FIG. 10 is a flow diagram depicting a procedure in an example implementation in which a suggestion machine-learning model generates a suggestion indicating why a digital image is not suitable to generate AR/VR digital content and/or how to correct generation of AR/VR digital content in a subsequent digital image.

In the following discussion, FIGS. 2 and 3 and corresponding discussion describe examples 200-300 of training a machine-learning model 110 for use by the content evaluation module 118 and the content suggestion module 120, respectively. FIGS. 4-7 include examples 400-700 of use of the trained machine-learning model 110 by the content evaluation module 118 to determine suitability of the input digital image 130 for generating AR/VR digital content. FIGS. 8-10 include examples 800-900 of use of the trained machine-learning model 110 by the content suggestion module 120 to generate suggestions indicative of why an object captured by an input digital image 130 may not be suitable to generate AR/VR digital content and/or how to correct capture of the object in a subsequent digital image.

In general, functionality, features, and concepts described in relation to the examples above and below may be employed in the context of the example procedures described in this section. Further, functionality, features, and concepts described in relation to different figures and examples in this document may be interchanged among one another and are not limited to implementation in the context of a particular figure or procedure. Moreover, blocks associated with different representative procedures and corresponding figures herein may be applied together and/or combined in different ways. Thus, individual functionality, features, and concepts described in relation to different example environments, devices, components, figures, and procedures herein may be used in any suitable combinations and are not limited to the particular combinations represented by the enumerated examples in this description.

Machine-Learning Model Training

FIG. 2 depicts an example 200 of operation of the machine-learning training system 108 of FIG. 1 to generate a machine-learning model 110 to indicate suitability of a digital image to generate AR/VR digital content. FIG. 3 depicts an example 300 of operation of the machine-learning training system 108 of FIG. 1 to generate a machine-learning model 110 to indicate when an input digital image is not suitable to generate AR/VR digital content and/or how to correct capture of an object in a subsequent digital image to generate AR/VR digital content.

The following discussion describes techniques that may be implemented utilizing the described systems and devices. Aspects of the procedure may be implemented in hardware, firmware, software, or a combination thereof. The procedure is shown as a set of blocks that specify operations performed by one or more devices and are not necessarily limited to the orders shown for performing the operations by the respective blocks. In portions of the following discussion, reference will be made to FIGS. 2-8 interchangeably.

In FIG. 2, the machine-learning training system 108 employs a model generation module 202 to train the machine-learning model 110 of FIG. 1 as an AR/VR suitability machine-learning module 204. In this illustrated example, the AR/VR suitability machine-learning model 204 is configured as a convolutional neural network (CNN) 206, although other types of models are also contemplated including statistical models, decision trees, and so on. A convolutional neural network 206 typically includes an input and an output layer along with one or more hidden layers. Hidden layers may include convolutional layers that convolve (e.g., with a dot product) inputs that are passed to subsequent layers, examples of which include pooling layers, normalization layer, fully connected layers, and so on. Backpropagation is employed as part of training the model to iteratively adjust weights of nodes (i.e., neurons) that form the layer based on a comparison or results of processing the CNN 206 during training with a desired result.

Therefore, in order to train the AR/VR suitability machine-learning model 204, the model generation module 202 receives training data 114 having a plurality of training digital images 116 from a digital image storage device 208. In this example, the training digital images 116 include indications (e.g., tag) of whether a corresponding digital image is suitable (i.e., good or bad) for generating AR/VR digital content. The training data 114, for instance, may be generated based on attempts to generate AR/VR digital content that are tagged manually by a user as generating suitable AR/VR digital content.

A good training digital image 212, for instance, may include a good for AR/VR tag 216 that indicates it is suitable for generating AR/VR digital content. In the illustrated example, the good training digital image 212 captures an object (e.g., a lamp) on a white background that is readily identifiable, has an entirety of the object included in the digital image (is not occluded), is focused, has appropriate resolution (i.e., zoom), and lighting. Thus, good training digital images 212 may be used to train the AR/VR suitability machine-learning model 204 to classify digital images as suitable for generating AR/VR digital content.

On the other hand, a bad training digital is used to train the CNN 206 to identify digital images that are not suitable for generating AR/VR digital content. Continuing the example above, the bad training digital image 214 captures an object (e.g., the lamp again) on a complex background such that it is difficult to distinguish the object from the back, is occluded and partially captured such that an entirety of the object is not viewable in the digital image, and may have other characteristics that make this training digital image unsuitable for generating AR/VR digital content, e.g., lighting, focus, resolution, and so forth as above. Thus, the bad training digital image 214 may include multiple characteristics that make it ill-suited for generating AR/VR digital content. Therefore, each of these training digital images 212, 214 are assigned a corresponding tag, e.g., good for AR/VR tag 216 and bad for AR/VR tag 218 respectively in this example to train the model.

Through use of the good and bad training digital images, the AR/VR suitability machine-learning model 204 is trained to generate a score (e.g., a probability) indicating an amount of suitability a respective digital image for generating AR/VR digital content. This score may be compared with a threshold (which may be user defined as described in greater detail in relation to FIGS. 4-7 in the following section) to indicate whether a corresponding digital image is or is not suitable for generating AR/VR digital content.

Figure 3:
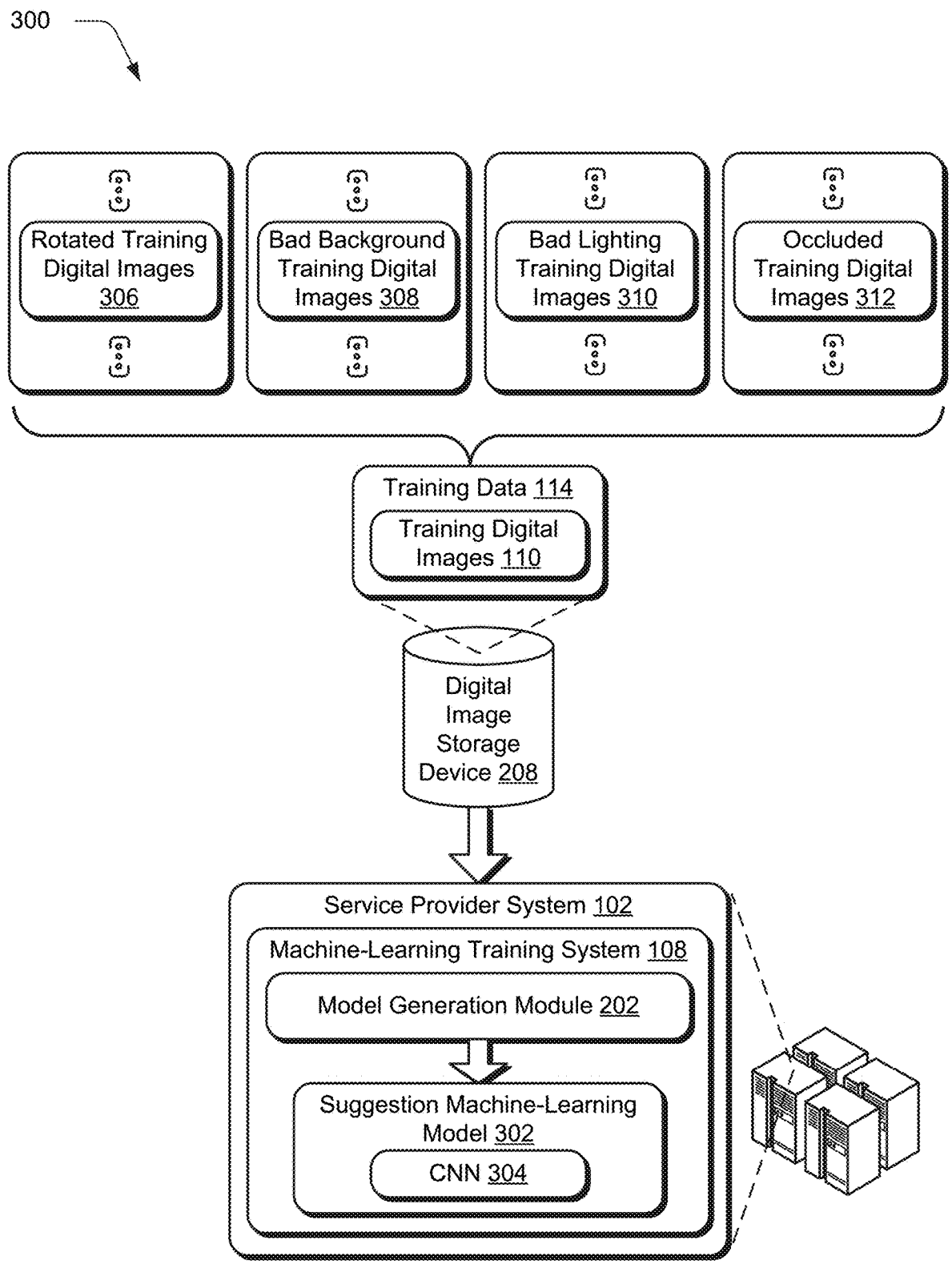
FIG. 3 depicts an example of operation of a machine-learning training system of FIG. 1 to generate a machine-learning model to indicate when an input digital image is not suitable to generate AR/VR digital content and/or how to correct capture of an object in a subsequent digital image to generate AR/VR digital content.

In FIG. 3, the machine-learning training system 108 employs the model generation module 202 to train the machine-learning model 110 of FIG. 1 as a suggestion machine-learning module 302. Like the illustrated example above, the suggestion machine-learning model 302 is configured as a convolutional neural network (CNN) 304, although other types of models are also contemplated including statistical models, decision trees, and so on. The convolutional neural network 304 includes an input and an output layer along with one or more hidden layers. Hidden layers may include convolutional layers that convolve (e.g., with a dot product) inputs that are passed to subsequent layers, examples of which include pooling layers, normalization layer, fully connected layers, and so on. Backpropagation is employed as part of training the model to iteratively adjust weights of nodes (i.e., neurons) that form the layer based on a comparison or results of processing the CNN 304 during training with a desired result.

In order to train the suggestion machine-learning model 302, the model generation module 202 receives training data 114 having a plurality of training digital images 116 from a digital image storage device 208 as above. In this example, however, the training digital images 116 are configured to identify reasons why a digital image is not suitable to generate AR/VR digital content and/or how to correct capture of an object in a subsequent digital image. Thus, in this example the CNN 304 is trained to identify errors in the training digital images 110 and classify these images accordingly to generate the suggestions.

In one example, the suggestion machine-learning module 302 is configured as a classifier to generate a single score (e.g., probability), or combined scores (e.g., a probability tuple) that a training digital image has a particular characteristic, or several characteristics that make it ill-suited to generate AR/VR digital content. As such, the model generation module 202 may generate a suggestion machine-learning model 302 for each of these characteristics. The suggestion machine-learning model 302, for instance, may be trained to identify rotation based on rotated training digital images 306, complex backgrounds using bad background training digital images 308, insufficient lighting through use of bad lighting training digital images 310, insufficient view of an object through use of occluded training digital images 312, and so on forth other characteristics such as angle, zoom, resolution, focus, and so forth. Good examples may also be employed along with the bad examples to train the suggestion machine-learning model 302 to differentiate the respective characteristics, e.g., good and bad rotated objects in digital images. Tags are used to distinguish these examples as described in relation to FIG. 2.

Through use of the good and bad training digital images, the suggestion machine-learning model 302 is trained to generate a score (e.g., a probability) indicating a likelihood that a digital image has one or more corresponding defects that make it ill-suited to generate AR/VR digital content. This score, for instance, may be compared with a threshold (which may be user defined as described in greater detail in relation to FIGS. 8-10 in the following section) to control output of the suggestion, e.g., to indicate "why" a corresponding digital image is not suited to generate AR/VR digital content and/or "how" to correct output of a subsequent digital image to generate suitable AR/VR digital content.

Suitability Determination to Generate AR/VR Digital Content

Figure 4:
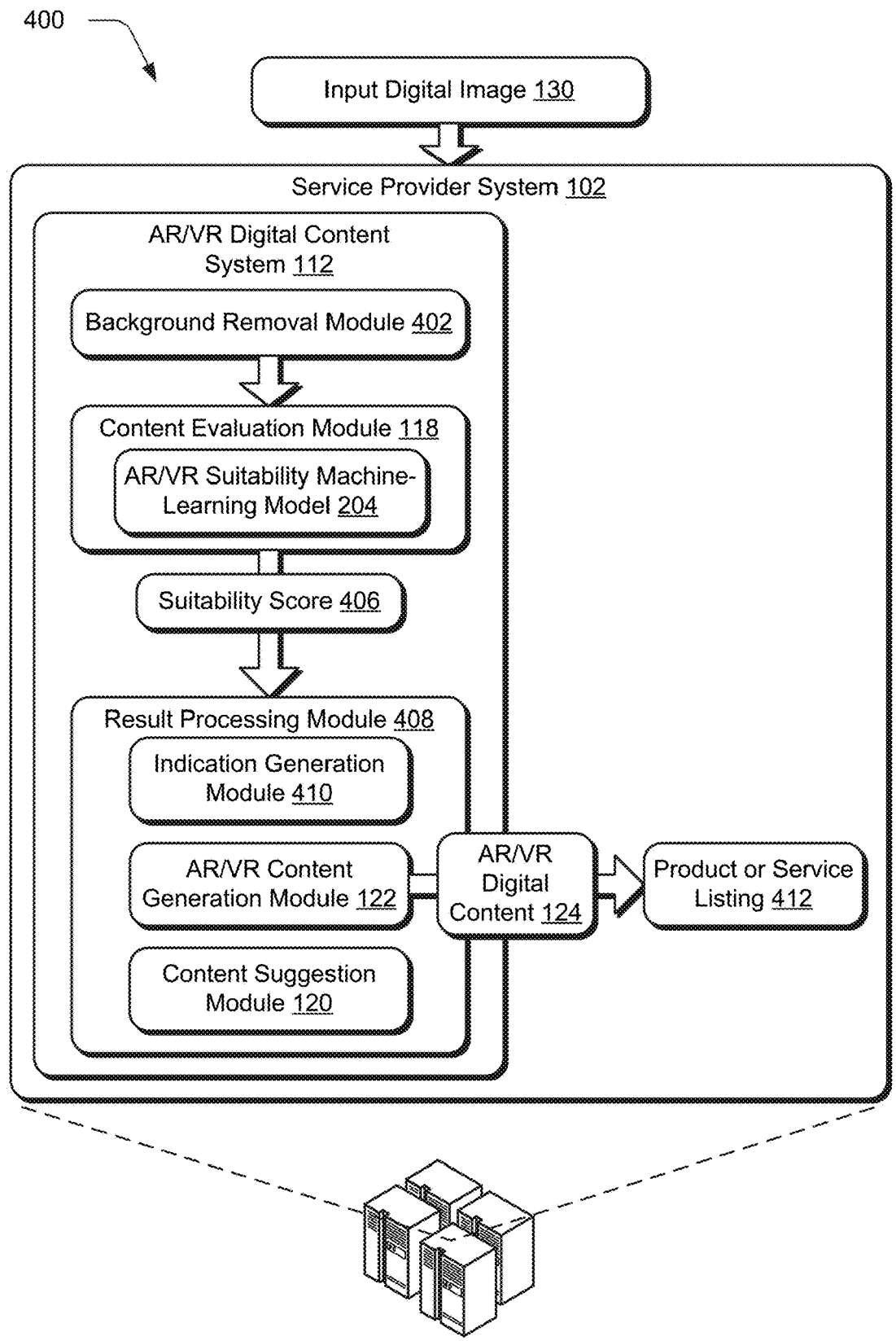
FIG. 4 depicts an example of operation of an AR/VR digital content system as employing the AR/VR suitability machine-learning model as trained in the example of FIG. 2 to determine suitability of the input digital image to generate AR/VR digital content.
Figure 5:
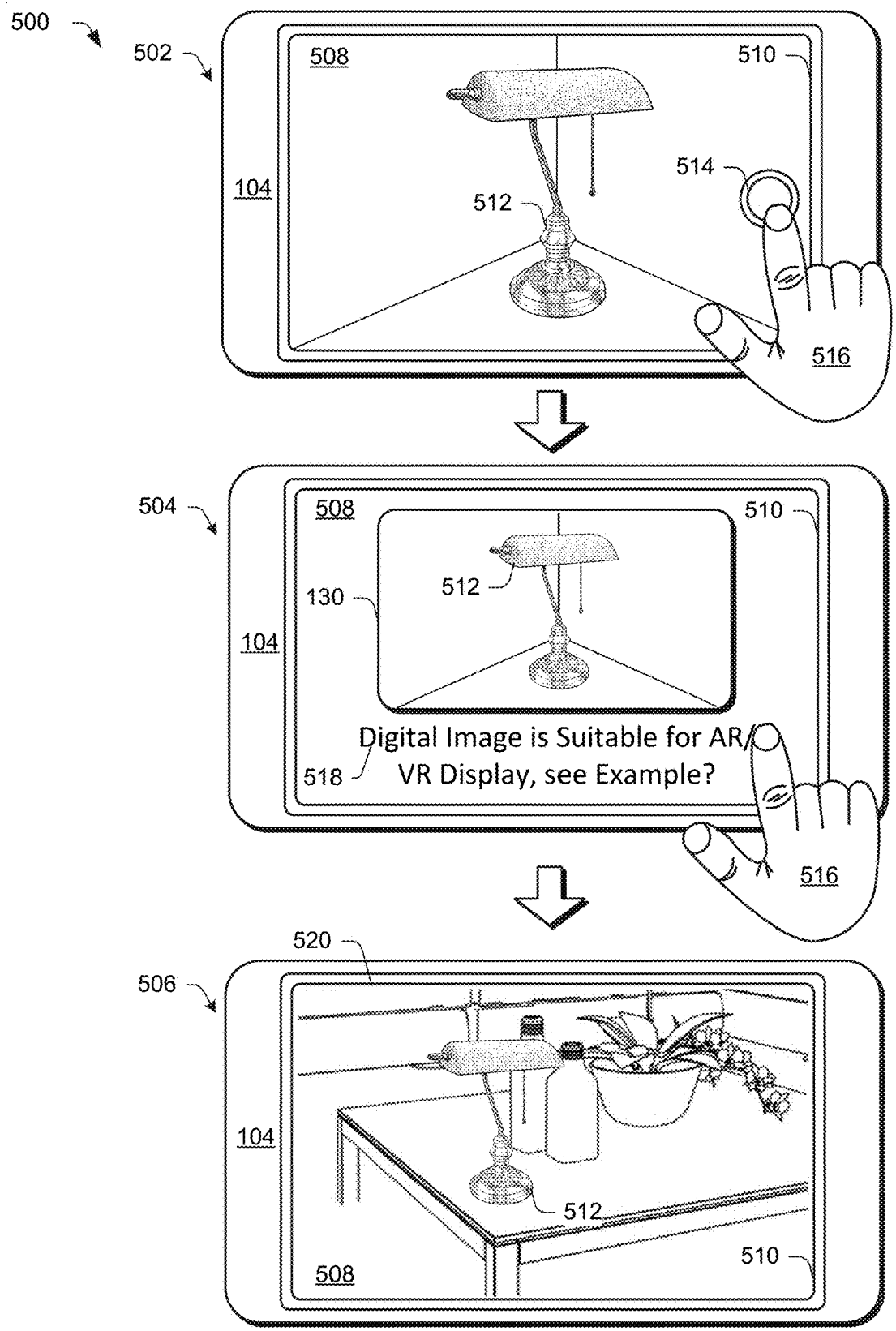
FIG. 5 depicts an example of output of a user interface used to initiate capture of a digital image and output of an indication of whether an object included in the digital image is suitable to generate AR/VR digital content, and generation of the AR/VR digital content.

FIG. 4 depicts an example 400 of operation of the AR/VR digital content system as employing the AR/VR suitability machine-learning model as trained in the example 200 of FIG. 2 to determine suitability of the input digital image 130 to generate AR/VR digital content. FIG. 5 depict an example 500 showing first, second, and third stages 502, 504, 506 of output of a user interface used to initiate capture of a digital image and output of an indication of whether an object included in the digital image is suitable to generate AR/VR digital content, and generation of the AR/VR digital content, respectively. FIG. 6 depicts an example 600 of implementation of the AR/VR digital content system 112 locally at the client device 104. FIG. 7 depicts a procedure 700 in an example implementation of determining suitability of a digital image for generating AR/VR digital content without actually generating the AR/VR digital content.

The following discussion describes techniques that may be implemented utilizing the described systems and devices. Aspects of the procedure may be implemented in hardware, firmware, software, or a combination thereof. The procedure is shown as a set of blocks that specify operations performed by one or more devices and are not necessarily limited to the orders shown for performing the operations by the respective blocks. In portions of the following discussion, reference will be made to FIGS. 4-7 interchangeably.

To begin in this example, a digital image is received (block 702) by the AR/VR digital content system 112. In the example 400 of FIG. 4, an input digital image 130 is received by the service provider system 102 over a network 106 from a client device 104. The input digital image 130, for instance, may be received as an upload to a social network service, a product listing service, a digital content creation service, or any other digital image sharing service.

In the example 600 of FIG. 6, a client device 104 employs a digital camera device 602 locally at the client device 104 to capture the input digital image 130 which is then provided as an input to the AR/VR digital content system 112. As illustrated at the first stage 502 of FIG. 4, for instance, a client device 104 outputs a user interface 508 using a display device 510. The user interface 508 includes a "live view" captured by the digital camera device 602, which in this instance includes an object 512 that is to be used to generate AR/VR digital content. An option 514 is included in the user interface 508 that is user selectable to initiate capture of the input digital image 130, e.g., by detecting selection via touchscreen functionality of the option 514 by a user's hand 516.

A determination is then made by the AR/VR digital content system 112 as to whether an object captured by the digital image (e.g., a two-dimensional digital image) is suitable for generating AR/VR digital content for display in an AR/VR environment. The determination is performed using a machine-learning model 110 (block 704), e.g., an AR/VR suitability machine learning model 204. The AR/VR digital content system 112, for instance, may first employ a background removal module 402 to remove a background from the input digital image 130, thereby leaving a view of the object. This may be performed in a variety of ways, such as through use of a mask based on object recognition, saliency, and so forth.

The input digital image 130, having the background removed, is then provided to a content evaluation module 118. The content evaluation module 118 includes the AR/VR suitability machine-learning model 204 which is trained as described in relation to FIG. 2 to calculate a suitability score 406. The suitability score is indicative of a degree, to which, the object included in the digital image is suitable for generating the AR/VR digital content for display in the AR/VR environment (block 706).

The suitability score 406, for instance, may describe a probability between "0" and "1" indicating a degree to which the input digital image 130 (e.g., having the background removed) is classified as suitable for generating AR/VR digital content. The suitability score 406 is then compared with a threshold (e.g., which may be user defined) by a result processing module 408 of the AR/VR digital content system 102 to determine whether the object 512 as captured by the input digital image 130 is suitable for generating AR/VR digital content (block 708). In this way, the threshold may be adjusted as desired to address varying degrees of suitability of the input digital image 130 to generate AR/VR digital content, i.e., different degrees to which the AR/VR digital content, when rendered, appears visually pleasing and/or "like it is really there."

In one example, a result of the determination is used by the result processing module 408 to output an indication for display in a user interface indicating the result of the determining as to whether the object is suitability for display in the AR/VR environment as AR/VR digital content (block 710). An indication generation module 410, for instance, may be employed to generate an indication 518 for display in the user interface 508. The user interface 508 at the second stage 504 of FIG. 5, for instance, is displayed concurrently with the input digital image 130 an indicates that the image is suitable for generating AR/VR digital content.

The indication 518 is also selectable (e.g., using touchscreen functionality to receive an input via a user's hand 516) to initiate generation of the AR/VR digital content. In response, the AR/VR content generation module 122 may generate the AR/VR digital content 124 for output, such as part of a product or service listing 412 as part of an ecommerce website, for use as a social media post, and so forth.

As part of generating the AR/VR digital content 124, the AR/VR content generation module 122 calculates a size and shape of the object 512 such that, when rendered as part of an AR/VR environment 520 has a corresponding size and shape to appear "like it is really there," an example of which is illustrated at the third stage 506 of FIG. 5. In one example, the AR/VR digital content 124 is generated from the two-dimensional input digital image 130 to also have two dimensions and as such reduces consumption of computational and network resources as well as supports real time output in the user interface 508. In another example, the object 512 as captured by the input digital image 130 is modeled (e.g., as corresponding to an existing model, "from scratch," and so on) in three dimensions for output in the user interface 508 by the user interface module 128. A variety of other examples are also contemplated. In one example, the AR/VR digital content is automatically generated upon a determination of suitability without receiving a user input.

In another example, the determination of suitability is also based on an AR/VR environment, in which, the AR/VR digital content is to be disposed. As described above, good and bad examples of an outcome may be used to train a machine-learning model 110. In this example, the outcome not only addresses whether the input digital image 130 is suitable for display in the AR/VR environment, but also the AR/VR environment itself and even portions of the environment such that the AR/VR digital content, when generated, looks visually pleasing and like "it is really there." For example, bright lighting conditions of a portion of an AR/VR environment may make AR/VR digital content that is darkly lit ill-suited for display in the AR/VR environment. Accordingly, suggestions may be output indicating such and/or corrections may be made automatically and without user intervention. A user viewing the AR/VR digital content may then be made aware of these changes, e.g., through use of an indication, by comparing the AR/VR digital content as generated differs from the object as captured by the input digital image 130, and so on.

In a further example, the determination of suitability may also address other AR/VR digital content included in the AR/VR environment. As further described in relation to FIG. 11, for instance, suitability may be leveraged as part of a search to suggest items of AR/VR digital content that are consistent with other items of AR/VR digital content and thus is suitable for display with those items. This may be based on a variety of factors, including a type of the AR/VR digital content (e.g., kitchen items, furniture), display characteristics of the other items of AR/VR digital content such that the items are visually consistent, and so forth.

In instances in which the input digital image is not suitable to generate AR/VR digital content, the content suggestion module 120 may be employed to generate a suggestion indicative as to why the input digital image 130 is not suitable and/or how to correct capture of the object 512 in a subsequent digital image. Additionally, the content suggestion module 120 may be employed to automatically and without user intervention, communicate to the digital camera 602 correction instructions and an image recapture request. An example of which is described in the following section.

Generation of Suggestions Regarding AR/VR Digital Content

FIG. 8 depicts an example 800 of operation of the AR/VR digital content system as employing the suggestion machine-learning model as trained in the example 300 of FIG. 3 to generate suggestions regarding suitability of the input digital image 130 to generate AR/VR digital content. FIG. 9 depicts first and second stages 902, 094 of an example 900 of output of a user interface used to initiate capture of a digital image and output of a suggestion. FIG. 10 depicts a procedure 1000 in an example implementation in which a suggestion machine-learning model generates a suggestion indicating why a digital image is not suitable to generate AR/VR digital content and/or how to correct generation of AR/VR digital content in a subsequent digital image.

The following discussion describes techniques that may be implemented utilizing the described systems and devices. Aspects of the procedure may be implemented in hardware, firmware, software, or a combination thereof. The procedure is shown as a set of blocks that specify operations performed by one or more devices and are not necessarily limited to the orders shown for performing the operations by the respective blocks. In portions of the following discussion, reference will be made to FIGS. 8-10 interchangeably.

Like the previous example, a digital image is received (block 1002) by the AR/VR digital content system 112. In the example 800 of FIG. 9, an input digital image 130 is received by the service provider system 102 over a network 106 from a client device 104. The input digital image 130, for instance, may be received as an upload to a social network service, a product listing service, a digital content creation service, or any other digital image sharing service. Other examples in which a digital camera included as part of the client device 104 is used to generate and receive the input digital image by the AR/VR digital content system 112 are also contemplated.

As shown at the first stage 902 of FIG. 9, for instance, a client device 104 employs a digital camera device to capture the input digital image 130 which is then provided as an input to the AR/VR digital content system 112. As before, the client device 104 outputs a user interface 508 using a display device 510. The user interface 508 includes a "live view" captured by the digital camera device, which in this instance includes an object 512 that is to be used to generate AR/VR digital content. An option 514 is included in the user interface 508 that is user selectable to initiate capture of the input digital image 130, e.g., by detecting selection via touchscreen functionality of the option 514 by a user's hand 516.

As described in the previous section, a determination is then made by the AR/VR digital content system 112 as to whether an object captured by the digital image (e.g., a two-dimensional digital image) is suitable for generating AR/VR digital content for display in an AR/VR environment. The determination is performed using an AR/VR suitability machine-learning model 204. The AR/VR digital content system 112, for instance, may first employ a background removal module 402 to remove a background from the input digital image 130, thereby leaving a view of the object. This may be performed in a variety of ways, such as through use of a mask based on object recognition, saliency, and so forth.

The input digital image 130, having the background removed, is then provided to a content evaluation module 118. The content evaluation module 118 includes the AR/VR suitability machine-learning model 204 which is trained as described in relation to FIG. 2 to calculate a suitability score 406. The suitability score is indicative of a degree, to which, the object included in the digital image is suitable for generating the AR/VR digital content for display in the AR/VR environment. In this example, a determination is made that the object captured by the digital image is not suitable for generating augmented reality/virtual reality (AR/VR) digital content for display in an AR/VR environment (block 1004).

Accordingly, a result of the determination is used by the content suggestion module 120 of the result processing module 408 to generate a suggestion (i.e., a suggestion result 802) using a suggestion machine-learning model 302 (block 1006) that is trained as described in relation to FIG. 3. Thus, in this example, the suggestion is generated automatically and without user intervention responsive to a determination that the input digital image 130 is not suitable. Other examples are also contemplated in which the suggestion is generated without such a determination.

The content suggestion module 120 includes one or more suggestion machine-learning models 302, each of which is configured to identify one or more characteristics as to why the object captured by the digital image is not suitable to generate the AR/VR digital content (block 1008) and/or how to correct capture of the object in a subsequent digital image (block 1010). The suggestion machine-learning model 302, for instance, may include a rotation model 804 that is trained to detect rotations of objects within a digital image that cause the digital image to be ill suited to generate AR/VR digital content. Likewise, a background model 806 may be trained to detect backgrounds that cause detection of the object within a digital image as not suitable to generate AR/VR digital content, i.e., is difficult to distinguish the object from the background. Other examples include a light model 808 that identifies lighting conditions, an occluded object model 810 usable to detect whether the object is occluded, an angle model 812, a zoom model 814, a resolution module 816, and an object detection model 818 that each identify a corresponding characteristic as to why the input digital image 130, and more particularly an object 512 included in the digital image is not suitable to generate the AR/VR digital content.

The determination of "why" the object in the input digital image 130 is not suitable to generate AR/VR digital content is also usable to indicate "how" to correct capture of the object in a subsequent digital image. As depicted at the second stage 904 of FIG. 9, for instance, a suggestion 906 is output that indicates "why" the digital image is not suitable to generate AR/VR digital content, e.g., "can't detect object" due to the background and "object is occluded." The suggestion 906 also includes an indication as to "how" to correct capture of a subsequent digital image, e.g., "try different background" and "try capturing whole object in frame."

This may be inferred from the model used to detect the characteristic and/or a model trained with greater specificity. A suggestion machine-learning model 302, for instance, may be trained, generally, to identify lighting conditions (e.g., dark, too light) that may cause the object in the input digital image 130 to be unsuitable to generate AR/VR digital content. In another instance, a first suggestion machine-learning model 302 may be trained to detect overexposure, whereas a second suggestion machine-learning model 302 may be trained to detect lack of light, i.e., is "too dark." In this way, the suggestion result 802 may be achieved with a desired degree of specificity. An indication generation module 410 is then configured to process the suggestion result 802 to output the suggestion for display in a user interface (block 1012), e.g., by a user interface module 129 of the client device 104. In the illustrated example of the second stage 904 of FIG. 9, the suggestion is rendered concurrently with a display of the input digital image 130, however other examples are also contemplated.

Alternately or in addition, when a determination is made that the object captured by the digital image is not suitable for generating AR/VR digital content for display in an AR/VR environment, the content suggestion module 120 may communicate instruction for autocorrecting a subsequent digital image of the object such that it will be suitable for generating AR/VR digital content, directly to the digital camera device 602. An "autocorrect image" button 908 is shown presented concurrently with the suggestion 906 regarding why the current image is not suitable and how it may be corrected. Thus, the user 516 has the option to select the autocorrect image button 908 using touchscreen functionality.

In yet another implementation, the content suggestion module 122 may automatically send correction instructions to the digital camera device 602 for auto correction (as illustrated using the arrow that communicatively couples the content suggestion module 120 to the digital camera device 602), capture a subsequent image implementing the correction, and display the corrected image on the display device 510 in a user interface, automatically and without user intervention. For example, if a user 516 captures an image of an object where the object is insufficiently illuminated for generating AR/VR digital content, the content suggestion module may automatically send instruction to the digital camera device 602 to recapture an image of the object using more light, and display the recaptured image on the display device 510. The correctly illuminated, recaptured digital image of the object will then be viewable on the display device 510. In addition, other auto corrections may be made automatically and without user intervention (e.g., image filters, display settings of the digital camera device 602, digital image post processing techniques, and so on), and the corrected subsequent image displayed for user viewing. For example, the digital image may be made lighter or darker, the image capture may be zoomed in for a more detailed image capture of an object, various filters may be applied for example a color harmonization, focus may be adjusted, an object may be automatically centered, and so forth.

In this way, the techniques described herein are implemented to overcome the limitations of conventional AR/VR generation techniques as well as provide an intuitive experience that can help guide a user through the process of successfully projecting a 2D image of an object into an AR/VR environment. The client device 104, for instance, is equipped with a digital camera device 602 that is used to display a live camera feed. An image of a 2D object that has been determined to be suitable for an AR/VR environment, can be projected into the live camera feed to augment the real live camera feed and display what the "real-world" would look like if the physical object where to be added in the real world. Using a 2D image creates a "pseudo 3D" AR/VR experience for a user that provides the benefits of a 3D AR/VR experience and mitigates the cumbersome interactions and device inefficiencies experienced when using full 3D object models in an AR/VR environment.

For example, a user may wish to add a piece or art to a bare wall in their home. Using their mobile phone, the user can open a live camera feed showing the bare wall, choose an image of a Van Gogh print, and place it on the wall in the live camera feed, thereby showing the user what their wall would look like if they hung a real physical version of the Van Gogh print on their wall. However, in order to project the image of the Van Gogh print in the AR/VR environment, specific requirements must be met such that the digital image is suitable to be viewed in the AR/VR environment.

The AR/VR suitability machine-learning model 204 is used to determination suitability of the digital image for display in an AR/VR environment. In this way millions or billions of images of objects may be classified as being suitable for inclusion in an AR/VR environment. For example, in a virtual marketplace, where a seller may list an item for sale, it is desirable that the seller provide an image of the item that is suitable for projection in an AR/VR environment, if the seller intends to take advantage of this increasingly popular feature of e-commerce. Thus, providing an indication that the digital image is or is not suitable informs that seller as to whether a digital image of an object provided to the marketplace is suitable for display in an AR/VR environment. Suggestions may also be generated as providing instructions on how to improve the digital image, such that an object captured by the subsequent digital image may then be suitable for display in the AR/VR environment. Alternately or in addition, an option for autocorrecting the capture of a subsequent digital image of the object may be provided, or a subsequent capture, implementing corrections, may be initiated automatically and without user intervention as described above.

This is an improvement over conventional AR/VR technology that typically uses complicated 3D models of objects and has no process for determining if the object is suitable for display in the AR/VR environment or not. In addition, a user is left with no indication as to what steps to take in order to ensure that the object is suitable for display, which is both computationally and user inefficient due to the multiple steps that would be required to correct this.

Non-Modal AR/VR Environment with Multiple AR/VR Digital Content

Figure 11:
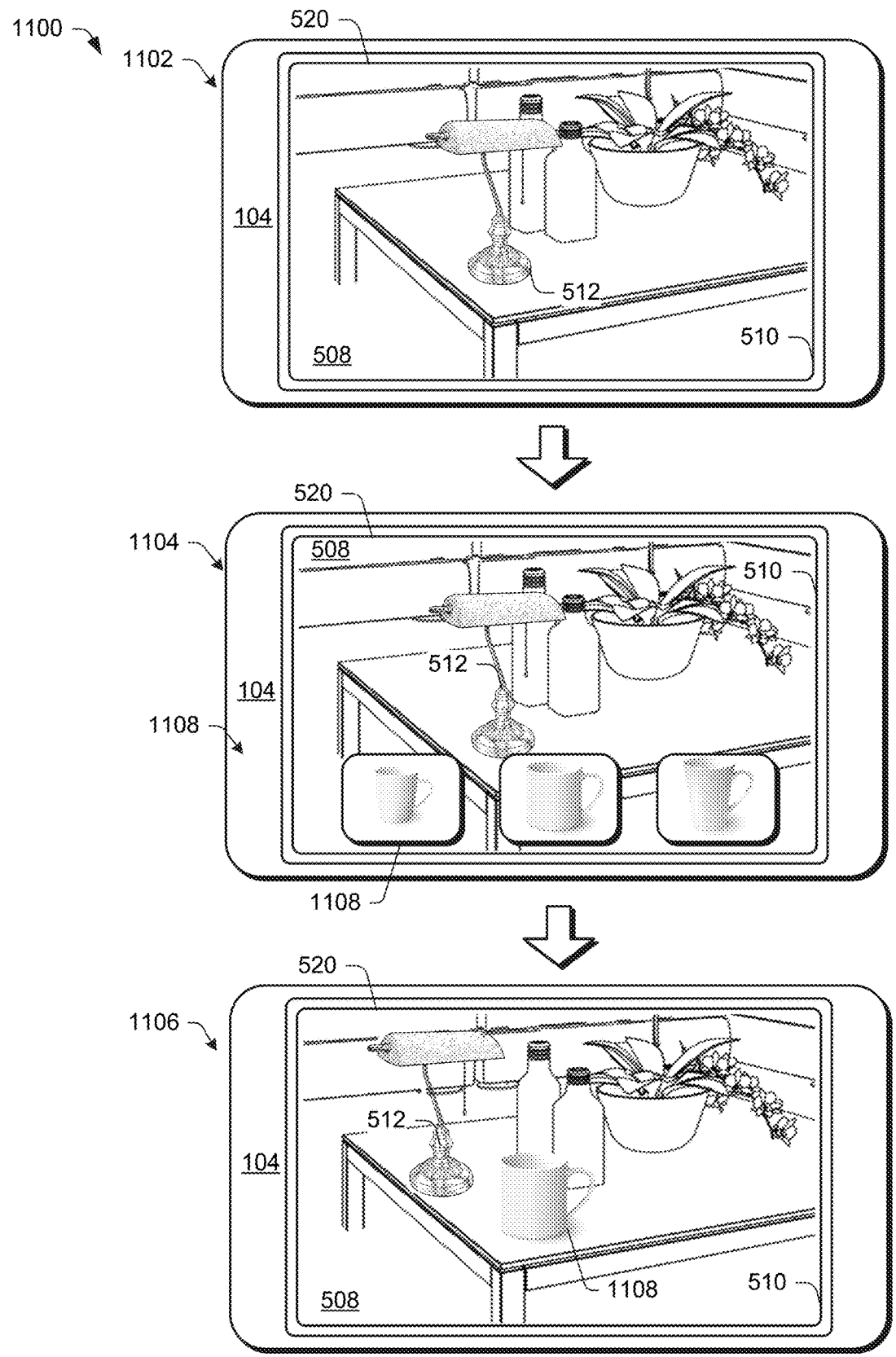
FIG. 11 depicts an example of output of a user interface showing a non-modal AR/VR environment displayed on a client device of FIG. 1 in which multiple generated items of AR/VR digital content are added to the AR/VR environment.
Figure 12:
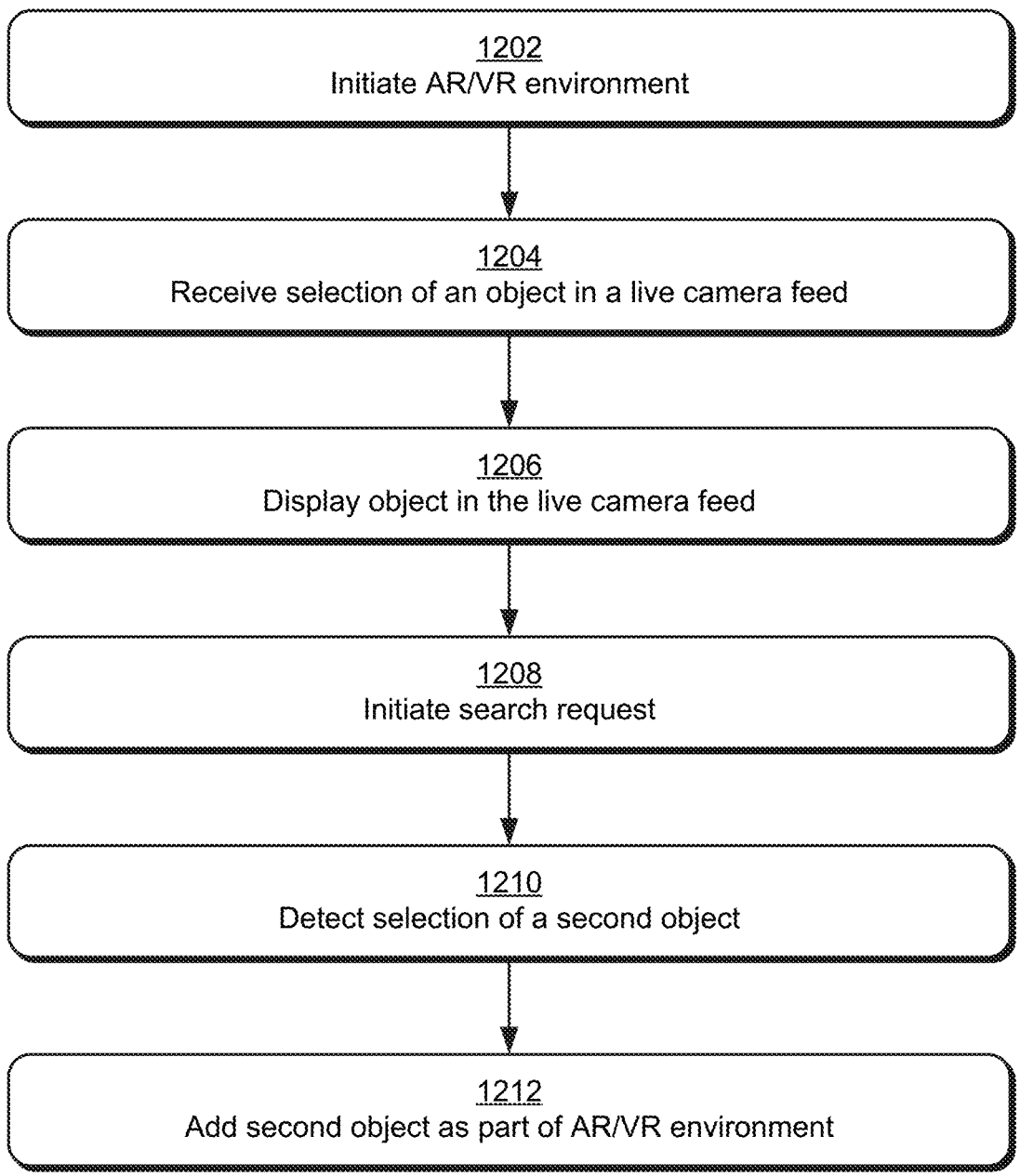
FIG. 12 is a flow diagram depicting a procedure in an example implementation in which multiple input digital images are determined to be suitable for generating multiple AR/VR digital content for display in an AR/VR environment.

FIG. 11 depicts an example 1100 of output of a user interface showing a non-modal AR/VR environment displayed on a client device 104 in which multiple generated objects of AR/VR digital content are added to the AR/VR environment. FIG. 12 depicts a procedure 1200 in which multiple input digital images are determined to be suitable for generating multiple AR/VR digital content for display in an AR/VR environment.

The following discussion describes techniques that may be implemented utilizing the described systems and devices. Aspects of the procedure may be implemented in hardware, firmware, software, or a combination thereof. The procedure is shown as a set of blocks that specify operations performed by one or more devices and are not necessarily limited to the orders shown for performing the operations by the respective blocks. In portions of the following discussion, reference will be made to FIGS. 11-12 interchangeably.

To begin this example, a client device 104 accessing a virtual marketplace initiates an AR/VR environment (block 1202) using a live camera feed captured by a digital camera device. The AR/VR environment may be initiated at multiple points in the virtual marketplace. For example, in an object search view, a camera icon may be present in the search bar and when selected an AR/VR environment is initiated, and a previously initiated search may continue for objects suitable for display in an AR/VR environment. In another example, an AR/VR environment may be initiated from a view object page. If a digital image of an object selected has been deemed suitable for generating AR/VR digital content as discussed above, an AR/VR environment may be initiated from the view object page and show the viewed object in an AR/VR environment. In yet another example, an AR/VR environment may be initiated from an object recommendation list. If a digital image of an object in a recommendation list has been deemed suitable for generating AR/VR digital content, an option to select the object and view it in an AR/VR environment may be provided.

After an AR/VR environment is initiated, any further action in the virtual marketplace may be conducted within the AR/VR environment, i.e., non-modally. FIG. 11 shows examples of first, second, and third stages of operation 1102, 1104, and 1106 in a virtual marketplace that take place in an AR/VR environment. At the first stage 1102, a first object (e.g., the lamp 512 of FIG. 5), has been selected (block 1204) and displayed in the live camera feed AR/VR environment (block 1206) similar to the third stage 506 of FIG. 5.

In response to a search request for a second object (block 1208), the second stage 1104 depicts a list of additional object recommendations based on the search. By detecting selection (block 1210) via touchscreen functionality of a second object (the coffee cup 1110), by a user's hand 516, the coffee cup 1108 is selected for display in the AR/VR environment. The third stage 1106 depicts the coffee cup 1108 as added to the AR/VR environment (block 1212) and placed beside the lamp 512 on the "real" table in the live camera feed of the AR/VR environment. In this example, this also includes automated rearranging of the objects, although other examples are also contemplated.

Thus, the second object of AR/VR content is non-modal with respect to output of the live camera feed within the AR/VR environment. The lamp 512 and coffee cup 1108 may be modified or manipulated in the AR/VR environment. For example, these object may be manually rearranged on the table, one of them may be removed, a third object may be searched for and added, etc., all within the existing AR/VR environment. Additionally, either object, or both may be added to a shopping cart and purchased in the AR/VR environment. Alternately, a user may exit the AR/VR environment at any point of operation if they choose.

As previously described, the determination of suitability may also address the AR/VR environment including other AR/VR digital content included in the AR/VR environment and thus may be employed as part of the non-modal live camera feed. Suitability, for instance, may be leveraged as part of the search to suggest items of AR/VR digital content that are consistent with other items of AR/VR digital content and thus is suitable for display with those items. This may be based on a variety of factors, including a type of the AR/VR digital content (e.g., kitchen items, furniture), display characteristics of the other items of AR/VR digital content such that the items are visually consistent with each other, and so forth.

As illustrated in FIG. 11, for instance, a search may be performed to locate items that are related to the lamp 512, which includes a selection of coffee cups as also pertaining to a general theme exhibited by the lamp 512. The items may also be selected to be visually consistent with the lamp 512 when generated as AR/VR digital content, e.g., include similar lighting, shadows, brightness, colors, and so forth. In this way, the suitability may be used to suggest items of AR/VR digital content based on characteristics of the AR/VR environment itself as well as characteristics of other items that are displayed in the AR/VR environment, e.g., the lamp 512. Other examples are also contemplated.

A non-modal AR/VR environment in which a user is able conduct a search, select from recommendation, put multiple objects in the same AR/VR environment, scale multiple objects, rearrange multiple objects, add and delete multiple objects, add one or more objects to a shopping cart, and complete a purchase, is an improvement over conventional techniques. Thus, the non-modal AR/VR environment, is not simply an object view mode, but rather the virtual marketplace as a whole. Conventional techniques are generally limited to a single object in an AR/VR environment, and typically do not provide for an end to end experience in which multiple actions may be conducted within a non-modal AR/VR environment. The non-modal AR/VR environment described herein improves user and operational efficiency of computing device that implement these techniques implemented to provide an end to end shopping experience in a virtual marketplace.

Example System and Device

Figure 13:
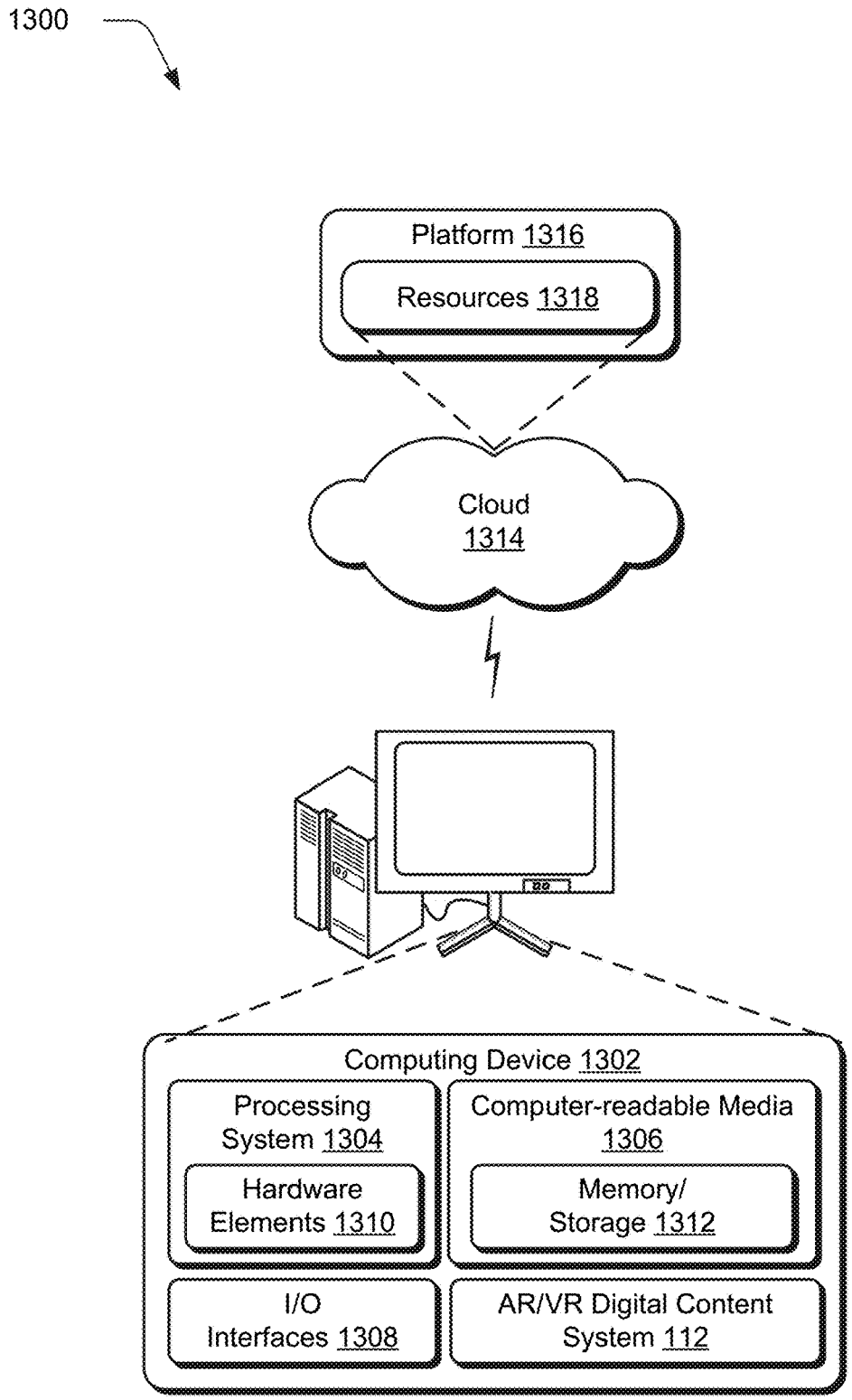
FIG. 13 illustrates an example system including various components of an example device that can be implemented as any type of computing device as described and/or utilize with reference to FIGS. 1-12 to implement embodiments of the techniques described herein.

FIG. 13 illustrates an example system generally at 1300 that includes an example computing device 1302 that is representative of one or more computing systems and/or devices that may implement the various techniques described herein. This is illustrated through inclusion of the colored three-dimensional digital model 116. The computing device 1302 may be, for example, a server of a service provider, a device associated with a client (e.g., a client device), an on-chip system, and/or any other suitable computing device or computing system.

The example computing device 1302 as illustrated includes a processing system 1304, one or more computer-readable media 1306, and one or more I/O interface 1308 that are communicatively coupled, one to another. Although not shown, the computing device 1302 may further include a system bus or other data and command transfer system that couples the various components, one to another. A system bus can include any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing system 1304 is representative of functionality to perform one or more operations using hardware. Accordingly, the processing system 1304 is illustrated as including hardware element 1310 that may be configured as processors, functional blocks, and so forth. This may include implementation in hardware as an application specific integrated circuit or other logic device formed using one or more semiconductors. The hardware elements 1310 are not limited by the materials from which they are formed or the processing mechanisms employed therein. For example, processors may be comprised of semiconductor(s) and/or transistors (e.g., electronic integrated circuits (ICs)). In such a context, processor-executable instructions may be electronically-executable instructions.

The computer-readable storage media 1306 is illustrated as including memory/storage 1312. The memory/storage 1312 represents memory/storage capacity associated with one or more computer-readable media. The memory/storage component 1312 may include volatile media (such as random access memory (RAM)) and/or nonvolatile media (such as read only memory (ROM), Flash memory, optical disks, magnetic disks, and so forth). The memory/storage component 1312 may include fixed media (e.g., RAM, ROM, a fixed hard drive, and so on) as well as removable media (e.g., Flash memory, a removable hard drive, an optical disc, and so forth). The computer-readable media 1306 may be configured in a variety of other ways as further described below.

Input/output interface(s) 1308 are representative of functionality to allow a user to enter commands and information to computing device 1302, and also allow information to be presented to the user and/or other components or devices using various input/output devices. Examples of input devices include a keyboard, a cursor control device (e.g., a mouse), a microphone, a scanner, touch functionality (e.g., capacitive or other sensors that are configured to detect physical touch), a camera (e.g., which may employ visible or non-visible wavelengths such as infrared frequencies to recognize movement as gestures that do not involve touch), and so forth. Examples of output devices include a display device (e.g., a monitor or projector), speakers, a printer, a network card, tactile-response device, and so forth. Thus, the computing device 1302 may be configured in a variety of ways as further described below to support user interaction.

Various techniques may be described herein in the general context of software, hardware elements, or program modules. Generally, such modules include routines, programs, objects, elements, components, data structures, and so forth that perform particular tasks or implement particular abstract data types. The terms "module," "functionality," and "component" as used herein generally represent software, firmware, hardware, or a combination thereof. The features of the techniques described herein are platform-independent, meaning that the techniques may be implemented on a variety of commercial computing platforms having a variety of processors.

An implementation of the described modules and techniques may be stored on or transmitted across some form of computer-readable media. The computer-readable media may include a variety of media that may be accessed by the computing device 1302. By way of example, and not limitation, computer-readable media may include "computer-readable storage media" and "computer-readable signal media."

"Computer-readable storage media" may refer to media and/or devices that enable persistent and/or non-transitory storage of information in contrast to mere signal transmission, carrier waves, or signals per se. Thus, computer-readable storage media refers to non-signal bearing media. The computer-readable storage media includes hardware such as volatile and non-volatile, removable and non-removable media and/or storage devices implemented in a method or technology suitable for storage of information such as computer readable instructions, data structures, program modules, logic elements/circuits, or other data. Examples of computer-readable storage media may include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and which may be accessed by a computer.

"Computer-readable signal media" may refer to a signal-bearing medium that is configured to transmit instructions to the hardware of the computing device 1302, such as via a network. Signal media typically may embody computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

As previously described, hardware elements 1310 and computer-readable media 1306 are representative of modules, programmable device logic and/or fixed device logic implemented in a hardware form that may be employed in some embodiments to implement at least some aspects of the techniques described herein, such as to perform one or more instructions. Hardware may include components of an integrated circuit or on-chip system, an application-specific integrated circuit (ASIC), a field-programmable gate array (FPGA), a complex programmable logic device (CPLD), and other implementations in silicon or other hardware. In this context, hardware may operate as a processing device that performs program tasks defined by instructions and/or logic embodied by the hardware as well as a hardware utilized to store instructions for execution, e.g., the computer-readable storage media described previously.

Combinations of the foregoing may also be employed to implement various techniques described herein. Accordingly, software, hardware, or executable modules may be implemented as one or more instructions and/or logic embodied on some form of computer-readable storage media and/or by one or more hardware elements 1310. The computing device 1302 may be configured to implement particular instructions and/or functions corresponding to the software and/or hardware modules. Accordingly, implementation of a module that is executable by the computing device 1302 as software may be achieved at least partially in hardware, e.g., through use of computer-readable storage media and/or hardware elements 1310 of the processing system 1304. The instructions and/or functions may be executable/operable by one or more articles of manufacture (for example, one or more computing devices 1302 and/or processing systems 1304) to implement techniques, modules, and examples described herein.

The techniques described herein may be supported by various configurations of the computing device 1302 and are not limited to the specific examples of the techniques described herein. This functionality may also be implemented all or in part through use of a distributed system, such as over a "cloud" 1314 via a platform 1316 as described below.

The cloud 1314 includes and/or is representative of a platform 1316 for resources 1318. The platform 1316 abstracts underlying functionality of hardware (e.g., servers) and software resources of the cloud 1314. The resources 1318 may include applications and/or data that can be utilized while computer processing is executed on servers that are remote from the computing device 1302. Resources 1318 can also include services provided over the Internet and/or through a subscriber network, such as a cellular or Wi-Fi network.

The platform 1316 may abstract resources and functions to connect the computing device 1302 with other computing devices. The platform 1316 may also serve to abstract scaling of resources to provide a corresponding level of scale to encountered demand for the resources 1318 that are implemented via the platform 1316. Accordingly, in an interconnected device embodiment, implementation of functionality described herein may be distributed throughout the system 1300. For example, the functionality may be implemented in part on the computing device 1302 as well as via the platform 1316 that abstracts the functionality of the cloud 1314.

CONCLUSION

Although the invention has been described in language specific to structural features and/or methodological acts, it is to be understood that the invention defined in the appended claims is not necessarily limited to the specific features or acts described. Rather, the specific features and acts are disclosed as example forms of implementing the claimed invention.

What is claimed is:

1. A method implemented by a computing device, the method comprising:
   receiving, by the computing device, a two-dimensional digital image;
   generating, by the computing device, a suggestion indicating why an object captured by the two-dimensional digital image is not suitable for generating augmented reality/virtual reality (AR/VR) digital content for display in an AR/VR environment, the generating performed using a machine-learning model;
   autocorrecting, by the computing device, a subsequent two-dimensional digital image based on the suggestion; and
   outputting, by the computing device, the autocorrected subsequent two-dimensional digital image.

2. The method as described in claim 1, further comprising outputting the suggestion for display in a user interface, the suggestion indicating that the two-dimensional digital image is not suitable for generating augmented reality/virtual reality (AR/VR) digital content.

3. The method as described in claim 2, wherein the suggestion includes an option that is user selectable to initiate the autocorrecting of the subsequent two-dimensional digital image.

4. The method as described in claim 1, wherein the autocorrecting is performed automatically and without user intervention as part of capturing the subsequent two-dimensional digital image responsive to the generating.

5. The method as described in claim 1, further comprising generating augmented reality/virtual reality (AR/VR) digital content using the autocorrected subsequent two-dimensional digital image.

6. The method as described in claim 1, wherein the suggestion indicates a correction involving rotation, background, lighting, occlusion, angle, zoom, or resolution.

7. A method implemented by a computing device, the method comprising:
   receiving, by the computing device, a two-dimensional digital image;
   determining, by the computing device, an object captured by the two-dimensional digital image is not suitable for generating augmented reality/virtual reality (AR/VR) digital content for display in an AR/VR environment;
   generating, by the computing device responsive to the determining, a suggestion indicative of how to improve capture of a subsequent two-dimensional digital image using a machine-learning model, the suggestion configured to include an option that is user selectable to initiate autocorrection in a capture of the subsequent two-dimensional digital image based on the suggestion; and
   outputting, by the computing device, the suggestion including the option to initiate autocorrection.

8. The method as described in claim 7, wherein the suggestion is further configured to initiate autocorrection of the subsequent two-dimensional digital image automatically and without user intervention.

9. The method as described claim 7, wherein the determining includes calculating, by the computing device, a score using the machine-learning model, the score indicative of a degree, to which, the object included in the two-dimensional digital image is suitable for generating the AR/VR digital content for display in the AR/VR environment.

10. The method as described in claim 9, wherein the score is configured as a probability generated by the machine-learning model configured as a classifier and the determining as to whether the object is suitable for generating the AR/VR digital content is based on comparing the probability to a threshold.

11. The method as described claim 7, wherein the suggestion is also indicative as to why the object is not suitable to generate the AR/VR digital content.

12. The method as described in claim 7, wherein the suggestion indicates a correction involving rotation, background, lighting, occlusion, angle, zoom, or resolution.

13. The method as described in claim 7, wherein the suggestion is configured to initiate autocorrection of the subsequent two-dimensional digital image responsive to selection of the option.

14. A system comprising:
a processing system; and
a computer-readable storage medium having stored instructions that, responsive to execution by the processing system, causes the processing system to perform operations including:
receiving a two-dimensional digital image;
determining an object captured by the two-dimensional digital image is not suitable for generating augmented reality/virtual reality (AR/VR) digital content for display in an AR/VR environment, the determining performed using a machine-learning model;
generating a suggestion indicating how to correct capture of a subsequent two-dimensional digital image;
autocorrecting capture of the subsequent two-dimensional digital image based on the suggestion; and
outputting the autocorrected subsequent two-dimensional digital image.

15. The system as described in claim 14, further comprising outputting an indication for display in a user interface indicating that the two-dimensional digital image is not suitable for generating augmented reality/virtual reality (AR/VR) digital content.

16. The system as described in claim 15, wherein the indication includes an option that is user selectable to initiate the autocorrecting.

17. The system as described in claim 14, wherein the autocorrecting is performed automatically responsive to the determining.

18. The system as described in claim 14, further comprising generating augmented reality/virtual reality (AR/VR) digital content using the autocorrected subsequent two-dimensional digital image.

19. The system as described in claim 14, wherein the suggestion is also indicative as to why the object is not suitable to generate the AR/VR digital content.

20. The system as described in claim 14, wherein the suggestion indicates a correction involving rotation, background, lighting, occlusion, angle, zoom, or resolution.

* * * * *